(12) United States Patent
Wang et al.

(10) Patent No.: US 10,397,553 B2
(45) Date of Patent: *Aug. 27, 2019

(54) TIME-RESOLVING SENSOR USING SHARED PPD+SPAD PIXEL AND SPATIAL-TEMPORAL CORRELATION FOR RANGE MEASUREMENT

(71) Applicant: Samsung Electronics Co., Ltd., Suwon-si, Gyeonggi-do (KR)

(72) Inventors: Yibing Michelle Wang, Temple City, CA (US); Lilong Shi, Austin, TX (US); Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,954

(22) Filed: Sep. 18, 2018

(65) Prior Publication Data

US 2019/0020864 A1    Jan. 17, 2019

Related U.S. Application Data

(63) Continuation of application No. 15/657,101, filed on Jul. 21, 2017, now Pat. No. 10,116,925.

(Continued)

(51) Int. Cl.
*H04N 13/254* (2018.01)
*H04N 5/3745* (2011.01)
(Continued)

(52) U.S. Cl.
CPC ......... *H04N 13/254* (2018.05); *G01S 7/4863* (2013.01); *G01S 17/10* (2013.01);
(Continued)

(58) Field of Classification Search
CPC .... H04N 13/254; H04N 5/3696; H04N 5/378; H04N 5/37455; G01S 7/4863; G01S 17/10

See application file for complete search history.

(56) References Cited

U.S. PATENT DOCUMENTS

2007/0182949 A1* 8/2007 Niclass .................. G01C 3/08
356/3
2011/0058153 A1  3/2011 Nieuwenhove et al.
(Continued)

OTHER PUBLICATIONS

Cho, Jihyun, et al., "A 3-D Camera With Adaptable Background Light Suppression Using Pixel-Binning and Super-Resolution", IEEE Journal of Solid-State Circuits 49.10 (2014): 2319-2332. Found via Google Scholar (url: http://scholarworks.unist.ac.kr/handle/201301/12286).

(Continued)

*Primary Examiner* — Nhan T Tran
(74) *Attorney, Agent, or Firm* — Renaissance IP Law Group LLP

(57) ABSTRACT

A Time-of-Flight (TOF) technique is combined with analog amplitude modulation within each pixel in a pixel array using multiple Single Photon Avalanche Diodes (SPADs) in conjunction with a single Pinned Photo Diode (PPD) in each pixel. A SPAD may be shared among multiple neighboring pixels. The TOF information is added to the received light signal by the analog domain-based single-ended to differential converter inside the pixel itself. The spatial-temporal correlation among outputs of multiple, adjacent SPADs in a pixel is used to control the operation of the PPD to facilitate recording of TOF values and range of an object. Erroneous range measurements due to ambient light are prevented by stopping the charge transfer from the PPD—and, hence, recording a TOF value—only when two or more SPADs in the pixel are triggered within a pre-defined time interval. An autonomous navigation system with multi-SPAD pixels provides improved vision for drivers under difficult driving conditions.

21 Claims, 10 Drawing Sheets

Related U.S. Application Data

(60) Provisional application No. 62/507,210, filed on May 16, 2017.

(51) Int. Cl.

| | |
|---|---|
| *H04N 5/369* | (2011.01) |
| *G01S 17/89* | (2006.01) |
| *H04N 5/378* | (2011.01) |
| *G01S 17/10* | (2006.01) |
| *G01S 7/486* | (2006.01) |

(52) U.S. Cl.
CPC ............ *G01S 17/89* (2013.01); *H04N 5/3696* (2013.01); *H04N 5/378* (2013.01); *H04N 5/37455* (2013.01)

(56) References Cited

U.S. PATENT DOCUMENTS

| | | | | |
|---|---|---|---|---|
| 2012/0075615 | A1* | 3/2012 | Niclass | G01S 7/4814 356/5.01 |
| 2013/0193546 | A1* | 8/2013 | Webster | H01L 27/1443 257/438 |
| 2016/0240579 | A1* | 8/2016 | Sun | H01L 27/14647 |
| 2017/0097417 | A1* | 4/2017 | Wang | H03K 19/0016 |
| 2018/0038945 | A1* | 2/2018 | Zhuang | G01S 7/4863 |
| 2018/0045816 | A1* | 2/2018 | Jarosinski | G01S 7/4814 |
| 2018/0128921 | A1* | 5/2018 | Mattioli Della Rocca | G01S 17/89 |
| 2018/0156896 | A1* | 6/2018 | O'Keeffe | G01S 7/4817 |
| 2018/0176492 | A1 | 6/2018 | Bamji et al. | |
| 2018/0306909 | A1 | 10/2018 | Seliuchenko | |

OTHER PUBLICATIONS

Niclass, Cristiano, et al., "Design and characterization of a 256x64-pixel single-photon imager in CMOS for a MEMS-pased laser scanning time-of-flight sensor", Optics Express 20.11 (2012): 11863-11881. Found via Google Scholar (url: http://ens.ewi.tudelft.nl/Education/courses/et4248/Papers/Niclass12.pdf).

Villa, F., et al., "SPAD smart pixel for time-of-flight and time-correlated single-photon counting measurements", IEEE Photonics Journal 4.3 (2012): 795-804. Found via IEEE Xplore and freely obtained via Google Scholar (url: http://ieeexplore.ieee.org/ie15/4563994/6189087/06198279.pdf).

Notice of Allowance for U.S. Appl. No. 15/657,101, dated Jun. 28, 2018.

Notice of Allowance for U.S. Appl. No. 16/254,582, dated Apr. 9, 2019.

\* cited by examiner

To detect 4 coincident photons:
F(x,y) = \(x*y);
G(a,b,c,d) = \(a+b+c+d)

To detect 3 coincident photons:
F(x,y) = \(x+y);
G(a,b,c,d) = \(a+b+c+d)

To detect 2 coincident photons:
F(x,y) = \(x*y);
G(a,b,c,d) = \(a*b*c*d)

TIME-RESOLVING SENSOR USING SHARED PPD+SPAD PIXEL AND SPATIAL-TEMPORAL CORRELATION FOR RANGE MEASUREMENT

CROSS-REFERENCE TO RELATED APPLICATIONS

This application is a continuation patent application of U.S. patent application Ser. No. 15/657,101, filed on Jul. 21, 2017, which claims the priority benefit under 35 U.S.C. § 119(e) of U.S. Provisional Application No. 62/507,210, filed on May 16, 2017, the disclosures of which are incorporated herein by reference in their entirety.

TECHNICAL FIELD

The present disclosure generally relates to image sensors. More specifically, and not by way of limitation, particular embodiments of the inventive aspects disclosed in the present disclosure are directed to a Time-of-Flight (TOF) image sensor in which a pixel uses spatial-temporal correlation among outputs of multiple, adjacent Single Photon Avalanche Diodes (SPADs) to control the operation of a time-to-charge converter, such as a Pinned Photo Diode (PPD), to facilitate recording of TOF values and range of a three-dimensional (3D) object.

BACKGROUND

Three-dimensional (3D) imaging systems are increasingly being used in a wide variety of applications such as, for example, industrial production, video games, computer graphics, robotic surgeries, consumer displays, surveillance videos, 3D modeling, real estate sales, autonomous navigation, and so on.

Existing 3D imaging technologies may include, for example, the time-of-flight (TOF) based range imaging, stereo vision systems, and structured light (SL) methods.

In the TOF method, distance to a 3D object is resolved based on the known speed of light—by measuring the round-trip time it takes for a light signal to travel between a camera and the 3D object for each point of the image. The outputs of pixels in the camera provide information about pixel-specific TOF values to generate a 3D depth profile of the object. A TOF camera may use a scannerless approach to capture the entire scene with each laser or light pulse. In a direct TOF imager, a single laser pulse may be used to capture spatial and temporal data to record a 3D scene. This allows rapid acquisition and rapid real-time processing of scene information. Some example applications of the TOF method may include advanced automotive applications such as autonomous navigation and active pedestrian safety or pre-crash detection based on distance images in real time, to track movements of humans such as during interaction with games on video game consoles, in industrial machine vision to classify objects and help robots find the items such as items on a conveyor belt, and so on.

In stereoscopic imaging or stereo vision systems, two cameras—displaced horizontally from one another—are used to obtain two differing views on a scene or a 3D object in the scene. By comparing these two images, the relative depth information can be obtained for the 3D object. Stereo vision is highly important in fields such as robotics, to extract information about the relative position of 3D objects in the vicinity of autonomous systems/robots. Other applications for robotics include object recognition, where stereoscopic depth information allows a robotic system to separate occluding image components, which the robot may otherwise not be able to distinguish as two separate objects—such as one object in front of another, partially or fully hiding the other object. 3D stereo displays are also used in entertainment and automated systems.

In the SL approach, the 3D shape of an object may be measured using projected light patterns and a camera for imaging. In the SL method, a known pattern of light—often grids or horizontal bars or patterns of parallel stripes—is projected onto a scene or a 3D object in the scene. The projected pattern may get deformed or displaced when striking the surface of the 3D objet. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging may be used in different applications such as, for example, by a police force to photograph fingerprints in a 3D scene, inline inspection of components during a production process, in health care for live measurements of human body shapes or the micro structures of human skin, and the like.

SUMMARY

In one embodiment, the present disclosure is directed to a pixel in an image sensor. The pixel comprises: (i) a plurality of Single Photon Avalanche Diodes (SPADs), wherein each SPAD is operable to convert received luminance into a corresponding electrical signal; (ii) a first control circuit coupled to the plurality of SPADs, wherein, for each SPAD receiving luminance, the first control circuit is operable to process the corresponding electrical signal from the SPAD and generate a SPAD-specific output therefrom; (iii) a Pinned Photo Diode (PPD) operable to store an analog charge; and (iv) a second control circuit coupled to the first control circuit and the PPD. In the pixel, the second control circuit is operable to: (a) initiate transfer of a portion of the analog charge from the PPD, and (b) terminate the transfer upon receipt of at least two SPAD-specific outputs from the first control circuit within a pre-defined time interval. In particular embodiments, the SPAD-specific outputs are digital signals.

In another embodiment, the present disclosure is directed to a method, which comprises: (i) projecting a laser pulse onto a three-dimensional (3D) object; (ii) applying an analog modulating signal to a PPD in a pixel; (iii) initiating transfer of a portion of an analog charge stored in the PPD based on modulation received from the analog modulating signal; (iv) detecting a returned pulse using a plurality of SPADs in the pixel, wherein the returned pulse is the projected pulse reflected from the 3D object, and wherein each SPAD is operable to convert luminance received from the returned pulse into a corresponding electrical signal; (v) for each SPAD receiving luminance, processing the corresponding electrical signal to generate a SPAD-specific digital output therefrom; (vi) terminating the transfer of the portion of the analog charge upon generation of at least two SPAD-specific digital outputs within a pre-defined time interval; and (vii) determining a Time of Flight (TOF) value of the returned pulse based on the portion of the analog charge transferred upon termination.

In a further embodiment, the present disclosure is directed to an imaging unit that comprises a light source and an image sensor unit. The light source is operative to project a laser pulse onto a 3D object. The image sensor unit includes: (i) a plurality of pixels arranged in a two-dimensional (2D) pixel array, and (ii) a processing unit coupled to the 2D pixel array. Each pixel in at least one row of pixels in the 2D pixel array includes: (a) a pixel-specific plurality of SPADs, wherein each SPAD is operable to convert luminance received in a returned pulse into a corresponding electrical signal, wherein the returned pulse results from reflection of the projected pulse by the 3D object; (b) a pixel-specific first control circuit coupled to the pixel-specific plurality of SPADs, wherein, for each SPAD receiving luminance in the returned pulse, the pixel-specific first control circuit is operable to process the corresponding electrical signal from the SPAD and generate a SPAD-specific output therefrom; (c) a pixel-specific device operable to store an analog charge; and (d) a pixel-specific second control circuit coupled to the pixel-specific first control circuit and the pixel-specific device, wherein the pixel-specific second control circuit is operable to initiate transfer of a pixel-specific first portion of the analog charge from the pixel-specific device, and terminate the transfer upon receipt of at least two SPAD-specific outputs from the pixel-specific first control circuit within a pre-defined time interval. In the image sensor unit, the processing unit is operative to: (a) provide an analog modulating signal to the pixel-specific second control circuit in each pixel in the row of pixels to control the transfer of the pixel-specific first portion of the analog charge, and (b) determine a pixel-specific TOF value of the returned pulse based on the transfer of the pixel-specific first portion of the analog charge within the pre-defined time interval.

In yet another embodiment, the present disclosure is directed to a system, which comprises: (i) a light source; (ii) a plurality of pixels; (iii) a plurality of ADC units; (iv) a memory for storing program instructions; and (v) a processor coupled to the memory, the plurality of ADC units, and the plurality of pixels. In the system, the light source projects a laser pulse onto a 3D object. In the plurality of pixels, each pixel includes: (a) a pixel-specific PPD operable to store an analog charge; (b) a pixel-specific plurality of SPADs, wherein each SPAD is operable to convert luminance received in a returned pulse into a corresponding electrical signal, wherein the returned pulse results from reflection of the projected pulse by the 3D object; and (c) a pixel-specific control circuit coupled to the pixel-specific PPD and the pixel-specific plurality of SPADs. The pixel-specific control circuit is operable to: (a) initiate a first transfer of a pixel-specific first portion of the analog charge from the pixel-specific PPD, (b) process the corresponding electrical signal from each SPAD receiving luminance in the returned pulse and generate a SPAD-specific output therefrom, (c) terminate the first transfer upon generation of at least two SPAD-specific outputs within a pre-defined time interval, and (d) initiate a second transfer a pixel-specific second portion of the analog charge from the pixel-specific PPD, wherein the pixel-specific second portion is substantially equal to a remainder of the analog charge after the pixel-specific first portion is transferred. In the system, each ADC unit is associated with a respective pixel in the plurality of pixels and is operative to generate a pixel-specific pair of signal values based on the first and the second transfers of the pixel-specific first and second portions of the analog charge, respectively. The pixel-specific pair of signal values includes a pixel-specific first signal value and a pixel-specific second signal value. In the system, the processor is configured to execute the program instructions, whereby the processor is operative to perform the following: (a) for each pixel, facilitate the first and the second transfers of the pixel-specific first and second portions of the analog charge, respectively; (b) receive each pixel-specific pair of signal values and determine a corresponding pixel-specific TOF value of the returned pulse using the pixel-specific first signal value and the pixel-specific second signal value; and (c) for each pixel in the plurality of pixels, determine a pixel-specific distance to the 3D object based on the pixel-specific TOF value.

BRIEF DESCRIPTION OF THE DRAWINGS

In the following section, the inventive aspects of the present disclosure will be described with reference to exemplary embodiments illustrated in the figures, in which.

DETAILED DESCRIPTION

Figure 1:
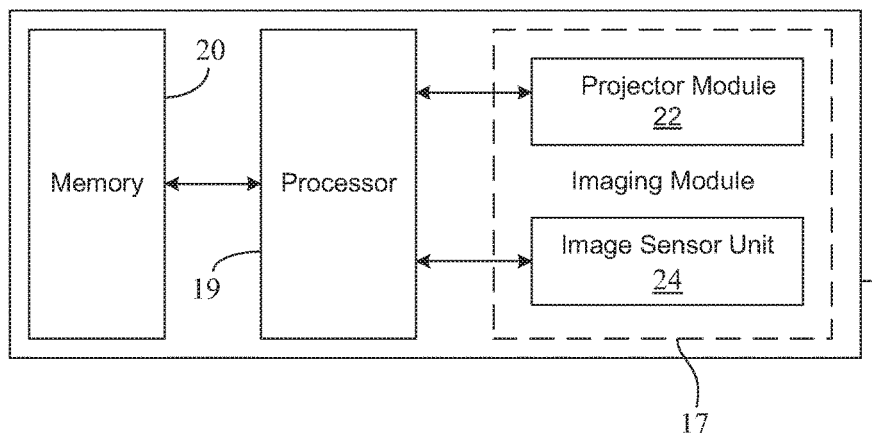
FIG. 1 shows a highly simplified, partial layout of a TOF imaging system according to one embodiment of the present disclosure.

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail so as not to obscure the present disclosure. Additionally, the described inventive aspects can be implemented to perform low power, range measurements and 3D imaging in any imaging device or system, including, for example, a computer, an automobile navigation system, and the like.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "three-dimensional," "pre-defined", "pixel-specific," etc.) may be occasionally interchangeably used with its non-hyphenated version (e.g., "three dimensional," "predefined", "pixel specific," etc.), and a capitalized entry (e.g., "Projector Module," "Image Sensor," "PIXOUT" or "Pixout," etc.) may be interchangeably used with its non-capitalized version (e.g., "projector module," "image sensor," "pixout," etc.). Such occasional interchangeable uses shall not be considered inconsistent with each other.

It is noted at the outset that the terms "coupled," "operatively coupled," "connected", "connecting," "electrically connected," etc., may be used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. However, such usage is for simplicity of illustration and ease of discussion only; it does not imply that the construction or architectural details of such components or units are the same across all embodiments or such commonly-referenced parts/modules are the only way to implement the teachings of particular embodiments of the present disclosure.

It is observed here that the earlier-mentioned 3D technologies have many drawbacks. For example, a range gated TOF imager may use multiple laser pulses to provide illumination and an optical gate to allow the light to reach the imager only during a desired time period. The range gated TOF imagers can be used in two-dimensional (2D) imaging to suppress anything outside a specified distance range, such as to see through fog. However, the gated TOF imagers may provide only Black-and-White (B&W) output and may not have 3D imaging capability. Furthermore, current TOF systems typically operate over a range of few meters to several tens of meters, but their resolution may decrease for measurements over short distances, thereby making 3D imaging within a short distance—such as, for example, in a fog or hard-to-see conditions—almost impractical. Also, pixels in existing TOF sensors may be vulnerable to ambient light.

The stereoscopic imaging approach generally works only with textured surfaces. It has high computational complexity because of the need to match features and find correspondences between the stereo pair of images of an object. This requires high system power. Furthermore, stereo imaging requires two regular, high bit resolution sensors along with two lenses, making the entire assembly unsuitable where space is at a premium such as, for example, in an automobile-based autonomous navigation system. Additionally, stereo 3D cameras have difficulty to see through fog and to deal with motion blur.

In contrast, particular embodiments of the present disclosure provide for implementing a TOF-based 3D imaging system, for example, on automotives for all weather conditions. Thus, improved vision for drivers may be provided under difficult conditions such as, for example, low light, bad weather, fog, strong ambient light, and the like. As discussed in more detail below, in a single pulse-based direct TOF system as per particular embodiments of the present disclosure, the TOF information is added to the received signal by means of controlled charge transferring and analog domain-based single-ended to differential converter inside the pixel itself. Thus, the present disclosure provides for a single chip solution that directly combines TOF and analog Amplitude Modulation (AM) within each pixel in the pixel array using multiple Single Photon Avalanche Diodes (SPADs) in conjunction with a single Pinned Photo Diode (PPD) (or another time-to-charge converter) in each pixel. The spatial-temporal correlation among outputs of multiple, adjacent SPADs in a pixel is used to control the operation of the PPD to facilitate recording of TOF values and range of a 3D object. As a result, an improved autonomous navigation system may be offered that can "see through" inclement weather at short range and produce 3D images as well as 2D grayscale images substantially independent of the ambient light.

FIG. 1 shows a highly simplified, partial layout of a TOF imaging system 15 according to one embodiment of the present disclosure. As shown, the system 15 may include an imaging module 17 coupled to and in communication with a processor or host 19. The system 15 may also include a memory module 20 coupled to the processor 19 to store information content such as, for example, image data received from the imaging module 17. In particular embodiments, the entire system 15 may be encapsulated in a single Integrated Circuit (IC) or chip. Alternatively, each of the modules 17, 19, and 20 may be implemented in a separate chip. Furthermore, the memory module 20 may include more than one memory chip, and the processor module 19 may comprise of multiple processing chips as well. In any event, the details about packaging of the modules in FIG. 1 and how they are fabricated or implemented—in a single chip or using multiple discrete chips—are not relevant to the present discussion and, hence, such details are not provided herein.

The system 15 may be any electronic device configured for 2D and 3D imaging applications as per teachings of the present disclosure. The system 15 may be portable or non-portable. Some examples of the portable version of the system 15 may include popular consumer electronic gadgets such as, for example, a mobile device, a cellphone, a smartphone, a User Equipment (UE), a tablet, a digital camera, a laptop or desktop computer, an automobile navigation unit, a Machine-to-Machine (M2M) communication unit, a Virtual Reality (VR) equipment or module, a robot, and the like. On the other hand, some examples of the non-portable version of the system 15 may include a game console in a video arcade, an interactive video terminal, an automobile with autonomous navigation capability, a machine vision system, an industrial robot, a VR equipment, and so on. The 3D imaging functionality provided as per teachings of the present disclosure may be used in many applications such as, for example, automobile applications such as all-weather autonomous navigation and driver assistance in low light or inclement weather conditions, human-machine interface and gaming applications, machine vision and robotics applications, and the like.

In particular embodiments of the present disclosure, the imaging module 17 may include a projector module (or light source module) 22 and an image sensor unit 24. As discussed in more detail with reference to FIG. 2 below, in one embodiment, the light source in the projector module 22 may be an Infrared (IR) laser such as, for example, a Near Infrared (NIR) or a Short Wave Infrared (SWIR) laser, to make the illumination unobtrusive. In other embodiments, the light source may be a visible light laser. The image sensor unit 24 may include a pixel array and ancillary processing circuits as shown in FIG. 2 and also discussed below.

In one embodiment, the processor 19 may be a Central Processing Unit (CPU), which can be a general purpose microprocessor. In the discussion herein, the terms "processor" and "CPU" may be used interchangeably for ease of discussion. However, it is understood that, instead of or in addition to the CPU, the processor 19 may contain any other type of processors such as, for example, a microcontroller, a Digital Signal Processor (DSP), a Graphics Processing Unit (GPU), a dedicated Application Specific Integrated Circuit (ASIC) processor, and the like. Furthermore, in one embodiment, the processor/host 19 may include more than one CPU, which may be operative in a distributed processing environment. The processor 19 may be configured to execute instructions and to process data according to a particular Instruction Set Architecture (ISA) such as, for example, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 19 may be a System on Chip (SoC) having functionalities in addition to a CPU functionality.

In particular embodiments, the memory module 20 may be a Dynamic Random Access Memory (DRAM) such as, for example, a Synchronous DRAM (SDRAM), or a DRAM-based Three Dimensional Stack (3DS) memory module such as, for example, a High Bandwidth Memory (HBM) module, or a Hybrid Memory Cube (HMC) memory module. In other embodiments, the memory module 20 may be a Solid State Drive (SSD), a non-3DS DRAM module, or any other semiconductor-based storage system such as, for example, a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), a Spin-Transfer Torque MRAM (STT-MRAM), and the like.

Figure 2:
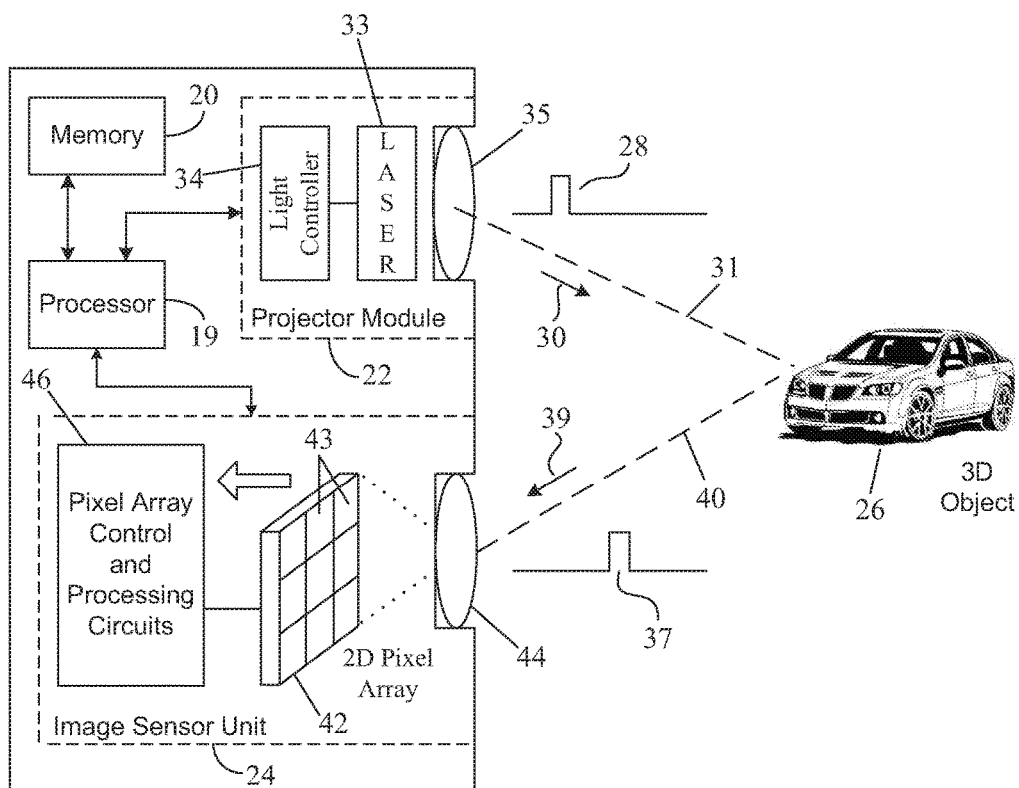
FIG. 2 illustrates an exemplary operational layout of the system in FIG. 1 according to one embodiment of the present disclosure.

FIG. 2 illustrates an exemplary operational layout of the system 15 in FIG. 1 according to one embodiment of the present disclosure. The system 15 may be used to obtain range measurements (and, consequently, a 3D image) for a 3D object, such as the 3D object 26, which may be an individual object or an object within a group of other objects. In one embodiment, the range and 3D depth information may be calculated by the processor 19 based on the measurement data received from the image sensor unit 24. In another embodiment, the range/depth information may be calculated by the image sensor unit 24 itself. In particular embodiments, the range information may be used by the processor 19 as part of a 3D user interface to enable the user of the system 15 to interact with the 3D image of the object or use the 3D image of the object as part of games or other applications—like an autonomous navigation application—running on the system 15. The 3D imaging as per teachings of the present disclosure may be used for other purposes or applications as well, and may be applied to substantially any 3D object, whether stationary or in motion.

The light source (or projector) module 22 may illuminate the 3D object 26 by projecting a short pulse 28 as shown by an exemplary arrow 30 associated with a corresponding dotted line 31 representing an illumination path of a light signal or optical radiation that may be used to project on the 3D object 26 within an optical Field Of View (FOV). The system 15 may be a direct TOF imager in which a single pulse may be used per image frame (of pixel array). In certain embodiments, multiple, short pulses may be transmitted onto the 3D object 26 as well. An optical radiation source, which, in one embodiment, may be a laser light source 33 operated and controlled by a laser controller 34, may be used to project the short pulse 28 onto the 3D object 26. The pulse 28 from the laser source 33 may be projected—under the control of the laser controller 34—onto the surface of the 3D object 26 via projection optics 35. The projection optics may be a focusing lens, a glass/plastics surface, or other cylindrical optical element. In the embodiment of FIG. 2, a convex structure is shown as a focusing lens 35. However, any other suitable lens design or an external optical cover may be selected for projection optics 35.

In particular embodiments, the light source (or illumination source) 33 may be a diode laser or a Light Emitting Diode (LED) emitting visible light, a light source that produces light in the non-visible spectrum, an IR laser (for example, an NIR or an SWIR laser), a point light source, a monochromatic illumination source (such as, for example, a combination of a white lamp and a monochromator) in the visible light spectrum, or any other type of laser light source. In autonomous navigation applications, the more unobtrusive NIR or SWIR laser may be preferred as the pulsed laser light source 33. In certain embodiments, the light source 33 may be one of many different types of laser light sources such as, for example, a point source with 2D scanning capability, a sheet source with one-dimensional (1D) scanning capability, or a diffused laser with matching FOV of the sensor unit 24. In particular embodiments, the laser 33 may be fixed in one position within the housing of the device 15, but may be rotatable in X-Y directions. The laser 33 may be X-Y addressable (for example, by the laser controller 34) to perform a scan of the 3D object 26. The laser pulse 28 may be projected onto the surface of the 3D object 26 using a mirror (not shown), or the projection may be completely mirror-less. In particular embodiments, the light source module 22 may include more or less components than those shown in the exemplary embodiment of FIG. 2.

In the embodiment of FIG. 2, the light/pulse 37 reflected from the object 26 may travel along a collection path indicated by an arrow 39 adjacent to a dotted line 40. The light collection path may carry photons reflected from or scattered by the surface of the object 26 upon receiving illumination from the laser source 33. It is noted here that the depiction of various propagation paths using solid arrows and dotted lines in FIG. 2 is for illustrative purpose only. The depiction should not be construed to illustrate any actual optical signal propagation paths. In practice, the illumination and collection signal paths may be different from those shown in FIG. 2, and may not be as clearly-defined as in the illustration in FIG. 2.

In TOF imaging, the light received from the illuminated object 26 may be focused onto a 2D pixel array 42 via collection optics 44 in the image sensor unit 24. The pixel array 42 may include one or more pixels 43. Like the projection optics 35, the collection optics 44 may be a focusing lens, a glass/plastics surface, or other cylindrical optical element that concentrates the reflected light received from the object 26 onto one or more pixels 43 in the 2D array 42. An optical band-pass filter (not shown) may be used as part of the collection optics 44 to pass only the light with the same wavelength as the wavelength of light in the illumination pulse 28. This may help suppress collection/reception of non-relevant light and reduce noise. In the embodiment of FIG. 2, a convex structure is shown as a focusing lens 44. However, any other suitable lens design or optical covering may be selected for collection optics 44. Furthermore, for ease of illustration, only a 3×3 pixel array is shown in FIG. 2 (and also in FIG. 8). However, it is understood that, modern pixel arrays contain thousands or even millions of pixels.

The TOF-based 3D imaging as per particular embodiments of the present disclosure may be performed using many different combinations of 2D pixel arrays 42 and laser light sources 33 such as, for example: (i) a 2D color (RGB) sensor with a visible light laser source, in which the laser source may be a red (R), green (G), or blue (B) light laser, or a laser source producing a combination of these lights; (ii) a visible light laser with a 2D RGB color sensor having an Infrared (IR) cut filter; (iii) an NIR or SWIR laser with a 2D IR sensor; (iv) an NIR laser with a 2D NIR sensor; (v) an NIR laser with a 2D RGB sensor (without an IR cut filter); (vi) an NIR laser with a 2D RGB sensor (without an NIR cut filter); (vii) a 2D RGB-IR sensor with visible or IR laser; (viii) a 2D RGBW (red, green, blue, white) or RWB (red, white, blue) sensor with either visible or NIR laser; and so on. In case of an NIR or other IR laser as, for example, in autonomous navigation applications, the 2D pixel array 42 may provide outputs to generate a grayscale image of the object 26. These pixel outputs also may be processed to obtain the range measurements and, hence, to generate a 3D image of the object 26, as discussed in more detail below. Additional architectural details of the image sensor unit 24 are discussed later with reference to FIG. 8, whereas exemplary circuit details of individual pixels 43 are shown and discussed later with reference to FIGS. 3-4 and 9.

Figure 8:
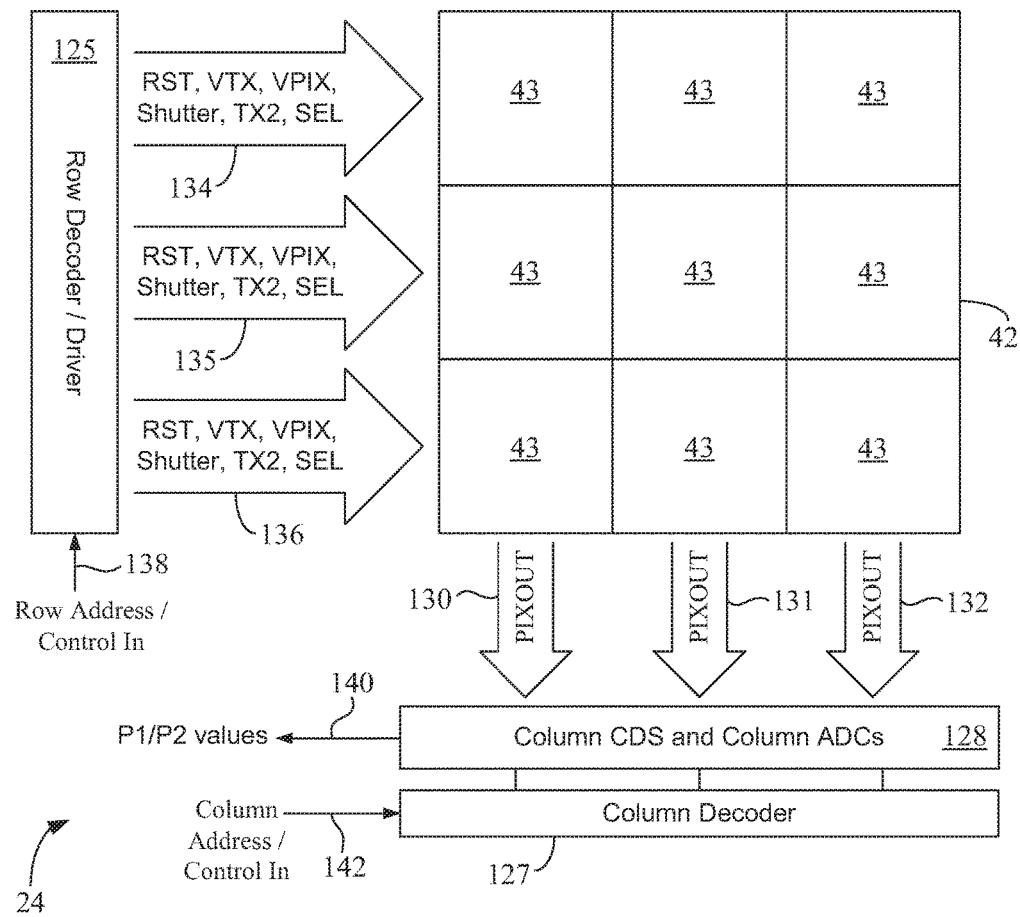
FIG. 8 is an exemplary layout of a portion of an image sensor unit according to one embodiment of the present disclosure.

The pixel array 42 may convert the received photons into corresponding electrical signals, which are then processed by the associated image processing unit 46 to determine the range and 3D depth image of the object 26. In one embodiment, the image processing unit 46 and/or the processor 19 may carry out range measurements. The image processing unit 46 may also include relevant circuits for controlling the operation of the pixel array 42. Exemplary image processing and control circuits are illustrated in FIG. 8, which is discussed later below. It is noted here that both the illumination unit 22 and the pixel array 42 may have to be controlled by high speed signals and synchronized. These signals have to be very accurate to obtain a high resolution. Hence, the processor 19 and the image processing unit 46 may be configured to provide relevant signals with accurate timing and high precision.

In the TOF system 15 in the embodiment of FIG. 2, the pixel array processing circuit 46 may receive a pair of pixel-specific outputs from each pixel 43 to measure the pixel-specific time (pixel-specific TOF value) the light has taken to travel from the illumination unit 22 to the object 26 and back to the pixel array 42. The timing calculation may use the approach discussed below. Based on the calculated TOF values, in certain embodiments, the pixel-specific distance to the object 26 may be calculated by the image processing unit 46 directly in the image sensor unit 24 to enable the processor 19 to provide a 3D distance image of the object 26 over some interface—such as, for example, a display screen or user interface.

The processor 19 may control the operations of the projector module 22 and the image sensor unit 24. Upon user input or automatically (as, for example, in a real-time autonomous navigation application), the processor 19 may repeatedly send a laser pulse 28 onto the surrounding 3D object(s) 26 and trigger the sensor unit 24 to receive and process incoming light signals 37. The processed image data received from the image processing unit 46 may be stored by the processor 19 in the memory 20 for TOF-based range computation and 3D image generation (if applicable). The processor 19 may also display a 2D image (for example, a grayscale image) and/or a 3D image on a display screen (not shown) of the device 15. The processor 19 may be programmed in software or firmware to carry out various processing tasks described herein. Alternatively or additionally, the processor 19 may comprise programmable hardware logic circuits for carrying out some or all of its functions. In particular embodiments, the memory 20 may store program code, look-up tables, and/or interim computational results to enable the processor 19 to carry out its functions.

Figure 3:
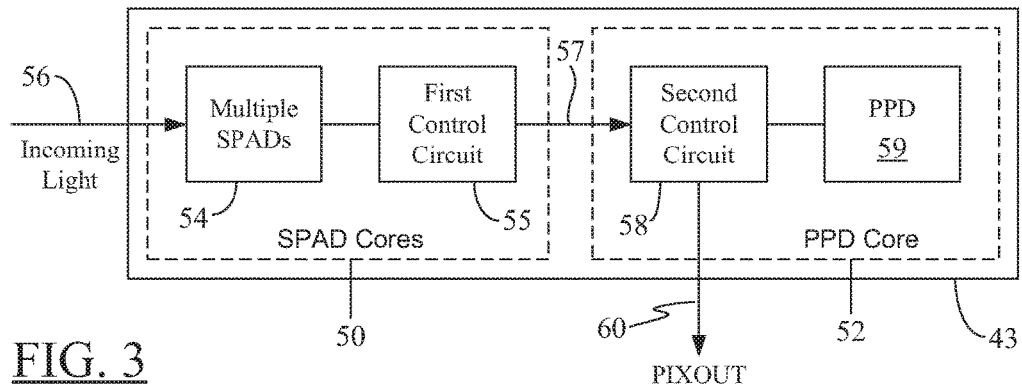
FIG. 3 shows an exemplary block diagram of a pixel according to particular embodiments of the present disclosure.

FIG. 3 shows an exemplary block diagram of a pixel, such as the pixel 43 in the pixel array 42 of FIG. 2, according to particular embodiments of the present disclosure. For TOF measurements, the pixel 43 may operate as a time-resolving sensor. A detailed explanation of the operation of the pixel 43 is provided later with reference to discussion of FIGS. 4-6 and 9-10. As shown in FIG. 3, the pixel 43 may include a SPAD core portion 50 electrically connected to a PPD core portion 52. Different exemplary arrangements of SPAD and PPD cores in a pixel as per teachings of the present disclosure are shown in FIG. 11, which is discussed later below. The SPAD core portion 50 may include multiple (two or more) SPADs 54 operatively connected to a first control circuit 55. One or more of the SPADs 54 may receive the incoming light—illustrated by arrow 56—and produce a corresponding SPAD-specific electrical signal, which is processed by the first control circuit 55 to generate a SPAD-specific digital output. All such digital outputs are collectively and symbolically illustrated in FIG. 3 using the arrow 57. The PPD core 52 may include a second control circuit 58 coupled to a PPD 59. The second control circuit 58 may receive the SPAD outputs 57 and responsively control the charge transfer from the PPD 59 to generate a pixel-specific analog output (PIXOUT) 60. More specifically, as discussed in more detail below, only when two or more of the adjacent SPADs 54 in the pixel 43 detect reflected photons in the incoming light 56 within a pre-defined time interval, then the charge transfer from the PPD 58 is stopped by the second control circuit 58 to facilitate recording of a TOF value and corresponding range of the 3D object 26. In other words, the spatial-temporal correlation among the outputs of at least two adjacent SPADs 54 is used to determine the operation of the PPD 59. Furthermore, in the pixel 43, the light-sensing functionality is performed by the SPADs 54, whereas the PPD 59 is used as a time-to-charge converter instead of a light-sensing element. Because the reflected photons (of the returned light pulse 37) are correlated with the transmitted pulse 28—as compared to uncorrelated ambient photons, the control of charge transfer from PPD 59 based on "triggering" of two or more adjacent SPADs within a pre-defined time interval provides for improved performance of the sensor 24 under strong ambient light through rejection of ambient photons, thereby substantially preventing range measurement errors.

Figure 4:
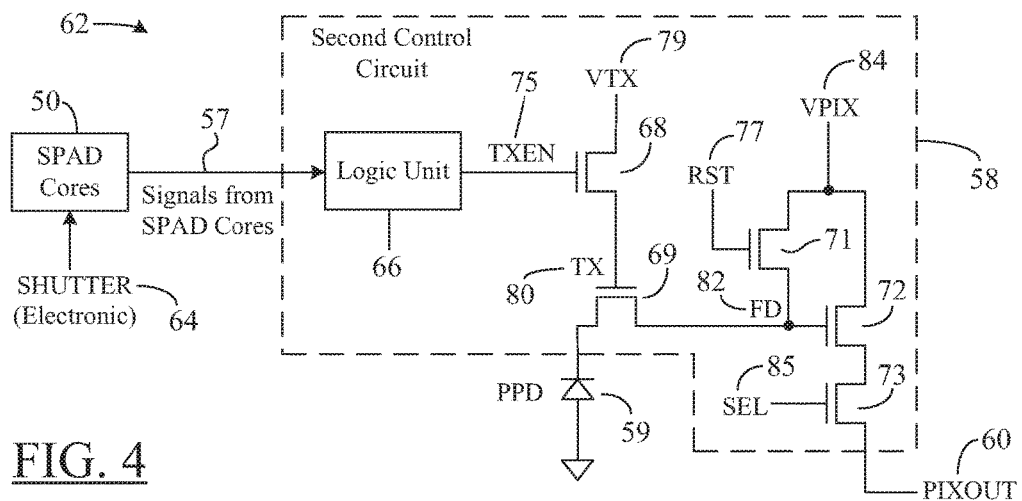
FIG. 4 depicts exemplary circuit details of a pixel according to certain embodiments of the present disclosure.

FIG. 4 depicts exemplary circuit details of a pixel 62 according to certain embodiments of the present disclosure. The pixel 62 in FIG. 4 is an example of the more generic pixel 43 in FIGS. 2-3. Therefore, the same reference numerals are used for the SPAD cores 50, the SPAD outputs 57, the PPD 59, and the second control circuit 58 in FIGS. 3-4 for ease of analogy. An electronic shutter signal 64 may be provided to each pixel (as discussed in more detail later with reference to the timing diagrams in FIGS. 5-6 and 10) to enable the pixel to capture the pixel-specific photoelectrons in the received light 37 in a temporally-correlated manner. More generally, the pixel 62 may be considered to have a charge transfer trigger portion, a charge generation and transfer portion, and a charge collection and output portion. The charge transfer trigger portion may include the SPAD cores 50 and a logic unit 66; the charge generation and transfer portion may include the PPD 59, a first N-channel Metal Oxide Semiconductor Field Effect Transistor (NMOSFET or NMOS transistor) 68, a second NMOS transistor 69, and a third NMOS transistor 71; and the charge collection and output portion may include the third NMOS transistor 71, a fourth NMOS transistor 72, and a fifth NMOS transistor 73. It is noted here that, in some embodiments, the PPD core in pixel 62 in FIG. 4 and that in the pixel 145 in FIG. 9 (discussed later) may be formed of P-channel Metal Oxide Semiconductor Field Effect Transistors (PMOSFETs or PMOS transistors) or other different types of transistors or charge transfer devices. Furthermore, the above-mentioned separation of various circuit components into respective portions is for illustrative and discussion purpose only. In certain embodiments, such portions may include more or less or different circuit elements than those listed here.

The PPD 59 may store analog charge similar to a capacitor. In one embodiment, the PPD 59 may be covered and does not respond to light. Thus, the PPD 59 may be used as a time-to-charge converter instead of a light sensing element. However, as noted before, the light-sensing functionality may be accomplished through the SPADs in the SPAD cores 50. In certain embodiments, a photogate or other semiconductor device—with suitable modifications—may be used instead of a PPD in the pixel configurations of FIGS. 4 and 9.

Under the operative control of the electronic Shutter signal 64, the charge transfer trigger portion may generate a Transfer Enable (TXEN) signal 75 to trigger the transfer of charge stored in the PPD 59. A SPAD may detect a photon (which may be referred to as a "photon detection event") in the light pulse that was transmitted and reflected off of an object, such as the object 26 in FIG. 2, and output a pulse signal, which may be latched—under the operative control of the shutter signal 64—for subsequent processing by the logic unit 66. As discussed in more detail later, the logic unit 66 may include logic circuits to process all digital SPAD outputs 57 to generate the TXEN signal 75 when outputs 57 are received from at least two adjacent SPADs within a pre-defined time interval—for example, while the shutter 64 is active.

Figure 9:
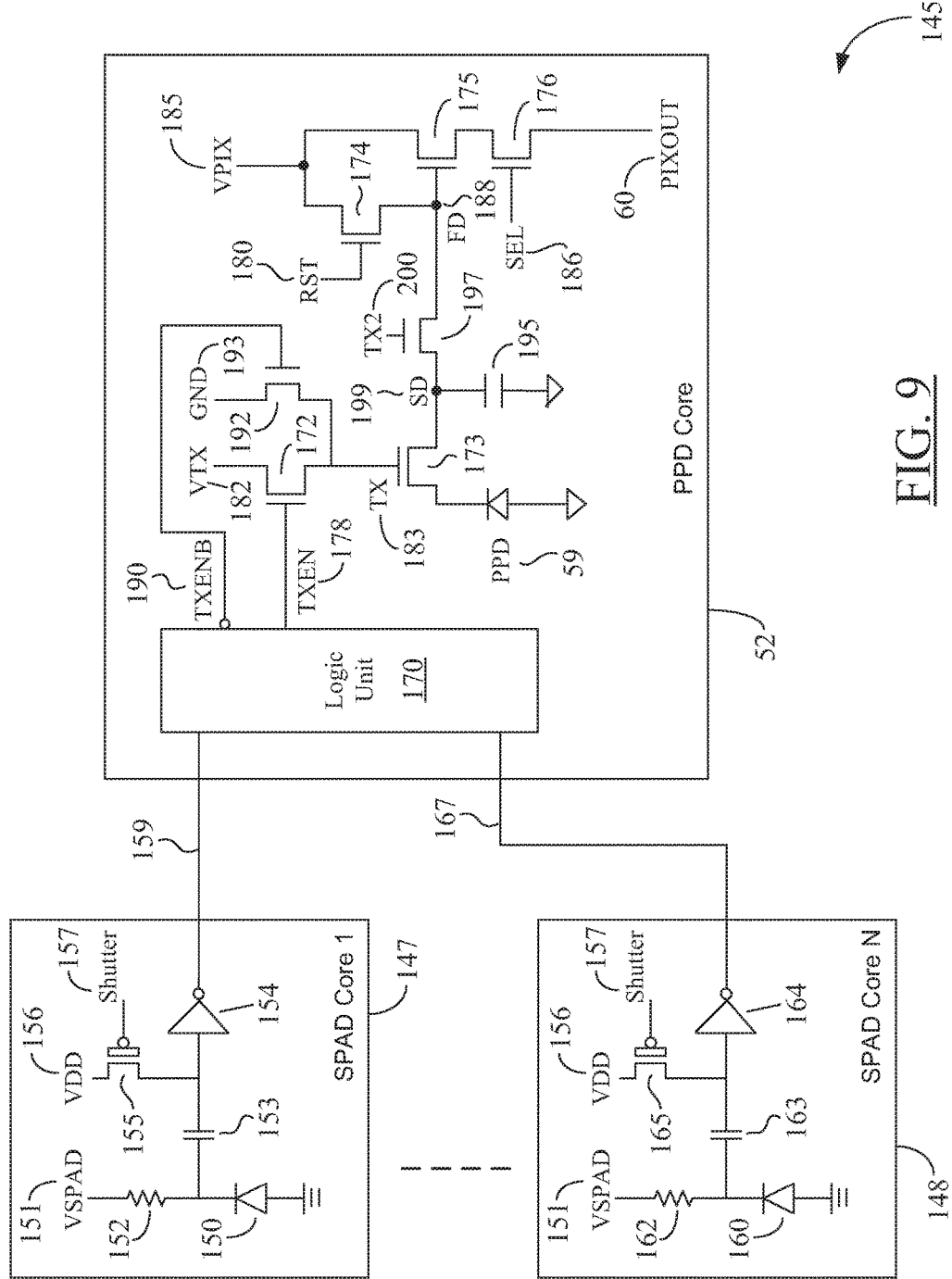
FIG. 9 shows exemplary circuit details of a pixel according to particular embodiments of the present disclosure.

In the charge generation and transfer portion, the PPD 59 may be initially set to its full well capacity using a Reset (RST) signal 77 in conjunction with the third transistor 71. The first transistor 68 may receive a Transfer Voltage (VTX) signal 79 at its drain terminal and the TXEN signal 75 at its gate terminal. A TX signal 80 may be available at the source terminal of the first transistor 68 and applied to the gate terminal of the second transistor 69. As shown, the source terminal of the first transistor 68 may be connected to the gate terminal of the second transistor 69. As discussed later below, the VTX signal 79 (or, equivalently, the TX signal 80) may be used as an analog modulating signal to control the analog charge to be transferred from the PPD 59, which may be connected to the source terminal of the transistor 69 in the configuration shown. The second transistor 69 may transfer the charge on the PPD 59 from its source terminal to its drain terminal, which may connect to the gate terminal of the fourth transistor 72 and form a charge "collection site" referred to as a Floating Diffusion (FD) node/junction 82. In particular embodiments, the charge transferred from the PPD 59 may depend on the modulation provided by the analog modulating signal 79 (or, equivalently, the TX signal 80). In the embodiments of FIGS. 4 and 9, the charge transferred is electrons. However, the present disclosure is not limited thereto. In an embodiment, a PPD with different design may be used, where the charge transferred may be holes.

In the charge collection and output portion, the third transistor 71 may receive the RST signal 77 at its gate terminal and a Pixel Voltage (VPIX) signal 84 at its drain terminal. The source terminal of the third transistor 71 may be connected to the FD node 82. In one embodiment, the voltage level of the VPIX signal 84 may equal to the voltage level of the generic supply voltage VDD and may be in the range of 2.5V (volts) to 3V. The drain terminal of the fourth transistor 72 also may receive the VPIX signal 84 as shown. In particular embodiments, the fourth transistor 72 may operate as an NMOS source follower to function as a buffer amplifier. The source terminal of the fourth transistor 72 may be connected to the drain terminal of the fifth transistor 73, which may be in cascode with the source follower 72 and receiving a Select (SEL) signal 85 at its gate terminal. The charge transferred from the PPD 59 and "collected" at the FD node 82 may appear as the pixel-specific output PIX-OUT 60 at the source terminal of the fifth transistor 73.

Briefly, as mentioned before, the charge transferred from the PPD 59 to FD 82 is controlled by the VTX signal 79 (and, hence, the TX signal 80). The amount of charge reaching the FD node 82 is modulated by the TX signal 80. In one embodiment, the voltage VTX 79 (and, also TX 80) may be ramped to gradually transfer charge from the PPD 59 to FD 82. Thus, the amount of charge transferred may be a function of the analog modulating voltage TX 80, and the ramping of the TX voltage 80 is a function of time. Hence, the charge transferred from the PPD 59 to the FD node 82 also is a function of time. If, during the transfer of charge from the PPD 59 to FD 82, the second transistor 69 is turned off (for example, becomes open-circuited) due to the generation of the TXEN signal 75 by the logic unit 66 upon photo detection events for at least two adjacent SPADs in the SPAD cores 50, the transfer of charge from the PPD 59 to the FD node 82 stops. Consequently, the amount of charge transferred to FD 82 and the amount of charge remaining in the PPD 59 are both a function of the TOF of the incoming photon(s). The result is a time-to-charge conversion and a single-ended to differential signal conversion. The PPD 59 thus operates as a time-to-charge converter. The more the charge is transferred to the FD node 82, the more the voltage decreases on the FD node 82 and the more the voltage increases on the PPD 59.

The voltage at the floating diffusion 82 may be later transferred as the Pixout signal 60 to an Analog-to-Digital Converter (ADC) unit (not shown) using the transistor 73 and converted into an appropriate digital signal/value for subsequent processing. More details of the timing and operation of various signals in FIG. 4 are provided below with reference to discussion of FIG. 6. In the embodiment of FIG. 4, the fifth transistor 73 may receive the SEL signal 85 for selecting the pixel 62 to readout the charge in the floating diffusion (FD) 82 as a PIXOUT1 (or Pixel Output 1) voltage and the remaining charge in the PPD 59 as a PIXOUT2 (or Pixel Output 2) voltage after it is completely transferred to the FD node 82, wherein the FD node 82 converts a charge on it to a voltage and the pixel output data line (PIXOUT) 60 sequentially outputs PIXOUT1 and PIXOUT2 signals as discussed later with reference to FIG. 6. In another embodiment, either the PIXOUT1 signal or the PIXOUT2 signal (but not both) may be read out.

In one embodiment, the ratio of one pixel output (for example, PIXOUT1) to the sum of the two pixel outputs (here, PIXOUT1+PIXOUT2) may be proportional to the time difference of time difference of "$T_{tof}$" and "$T_{dly}$" values, which are shown, for example, in FIG. 6 and discussed in more detail later below. In case of the pixel 62, for example, the "$T_{tof}$" parameter may be a pixel-specific TOF value of a light signal received by two or more SPADs in the SPAD cores 50 and the delay time parameter "$T_{dly}$" may be the time from when the light signal 28 was initially transmitted until the VTX signal 79 starts to ramp. The delay time ($T_{dly}$) may be negative when the light pulse 28 is transmitted after VTX 79 starts to ramp (which may typically occur when the electronic shutter 64 is "opened"). The above-mentioned proportionality relation may be represented by the following equation:

$$\frac{Pixout1}{Pixout1 + Pixout2} \propto (T_{tof} - T_{dly}) \quad (1)$$

However, the present disclosure is not limited to the relationship present in equation (1). As discussed below, the ratio in equation (1) may be used to calculate depth or distance of a 3D object, and is less sensitive to pixel-to-pixel variations when Pixout1+Pixout2 is not always the same.

For ease of reference, the term "P1" may be used to refer to "Pixout1" and the term "P2" may be used to refer to "Pixout2" in the discussion below. It is seen from the relationship in equation (1) that the pixel-specific TOF value may be determined as a ratio of the pixel-specific output values P1 and P2. In certain embodiments, once the pixel-specific TOF value is so determined, the pixel-specific distance ("D") or range ("R") to an object (such as the 3D object 26 in FIG. 2) or a specific location on the object may be given by:

$$D = T_{tof} * \frac{c}{2} \quad (2)$$

where the parameter "c" refers to the speed of light. Alternatively, in some other embodiments where the modulating signal—such as the VTX signal 79 (or the TX signal 80) in FIG. 4, for example—is linear inside a shutter window, the range/distance may be computed as:

$$D = \frac{c}{2} * \left(\frac{P_1}{P_1 + P_2} + T_{dly}\right) \quad (3)$$

Consequently, a 3D image of the object—such as the object 26—may be generated by the TOF system 15 based on the pixel-specific range values determined as given above.

In view of the present disclosure's analog modulation-based manipulation or control of the PPD charge distribution inside a pixel itself, the range measurement and resolution are also controllable. The pixel-level analog amplitude modulation of the PPD charge may work with an electronic shutter that may be a rolling shutter as, for example, in a Complementary Metal Oxide Semiconductor (CMOS) image sensor, or a global shutter as, for example, in a Charge Coupled Device (CCD) image sensor. Furthermore, although the disclosure herein is primarily provided in the context of a one-pulse TOF imaging system, like the system 15 in FIGS. 1-2, the principles of pixel-level internal analog modulation approach discussed herein may be implemented, with suitable modifications (if needed), in a continuous wave modulation TOF imaging system or a non-TOF system as well with pixels 43 (FIG. 3).

Figure 5:
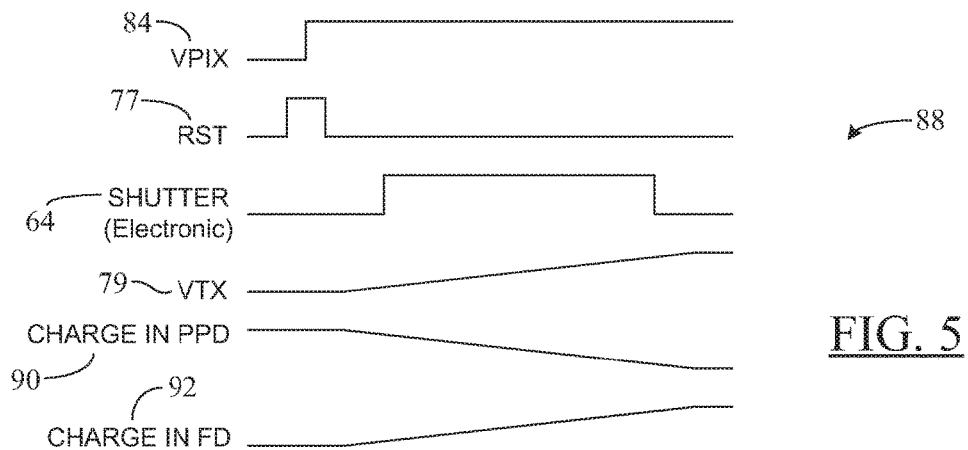
FIG. 5 is an exemplary timing diagram that provides an overview of the modulated charge transfer mechanism in the pixel of FIG. 4 according to one embodiment of the present disclosure.

FIG. 5 is an exemplary timing diagram 88 that provides an overview of the modulated charge transfer mechanism in the pixel 62 of FIG. 4 according to one embodiment of the present disclosure. The waveforms shown in FIG. 5 (and also in FIGS. 6 and 10) are simplified in nature and are for illustrative purpose only; the actual waveforms may differ in timing as well as shape depending on the circuit implementation. The signals common between FIGS. 4 and 5 are identified using the same reference numerals for ease of comparison. These signals include the VPIX signal 84, the RST signal 77, the electronic SHUTTER signal 64, and the VTX modulating signal 79. Two additional waveforms 90, 92 are also shown in FIG. 5 to illustrate the status of the charge in PPD 59 and that in the FD 82, respectively, when modulating signal 79 is applied during charge transfer. In the embodiment of FIG. 5, VPIX 84 may start as a low logic voltage (for example, logic 0 or 0 volts) to initialize the pixel 62 and switch to a high logic voltage (for example, logic 1 or 3 volts (3V)) during operation of the pixel 62. RST 77 may start with a high logic voltage pulse (for example, a pulse that goes from logic 0 to logic 1 and back to logic 0) during the initialization of the pixel 62 to set the charge in the PPD 59 to its full well capacity and set the charge in the FD 82 to zero Coulombs (0 C). The reset voltage level for FD 82 may be a logic 1 level. During a range (TOF) measurement operation, the more electrons the FD 82 receives from the PPD 59, the lower the voltage on the FD 82 becomes. The SHUTTER signal 64 may start with a low logic voltage (for example, logic 0 or 0V) during the initialization of the pixel 62, switch to a logic 1 level (for example, 3 volts) at a time that corresponds to the minimum measurement range during operation of the pixel 62 to enable the SPADs 54 in the SPAD cores 50 to detect the photon(s) in the returned light pulse 37, and then switch to a logic 0 level (for example, 0V) at a time that corresponds to the maximum measurement range. Thus, the duration of the logic 1 level of the shutter signal 64 may provide a pre-defined time interval/window such that the outputs received from adjacent SPADs during that time interval have spatial and temporal correlation. The charge in the PPD 59 starts out fully charged during initialization and decreases as VTX 79 is ramped from 0V to a higher voltage, preferably in a linear fashion. The PPD charge level under the control of the analog modulating signal 79 is illustrated by waveform with reference numeral "90" in FIG. 5. The PPD charge decrease may be a function of how long VTX ramps, which results in a transfer of a certain amount of charge from the PPD 59 to the FD 82. Thus, as shown by the waveform with reference numeral "92" in FIG. 5, a charge in FD 82 starts out at a low charge (for example, 0 C) and increases as VTX 79 is ramped from 0V to a higher voltage, which partially transfers a certain amount of charge from the PPD 59 to the FD 82. This charge transfer is a function of how long VTX 79 ramps.

As noted before, the pixel-specific output (PIXOUT) 60 is derived from the PPD charge transferred to the floating diffusion node 82. Thus, the Pixout signal 60 may be considered as amplitudes modulated over time by the analog modulating voltage VTX 79 (or, equivalently, the TX voltage 80). In this manner, the TOF information is provided through Amplitude Modulation (AM) of the pixel-specific output 60 using the modulating signal VTX 79 (or, equivalently, the TX signal 80). In particular embodiments, the modulating function for generating the VTX signal 79 may be monotonic. In the exemplary embodiments of FIGS. 5, 6, and 10, the analog modulating signals may be generated using a ramp function and, hence, they are shown as having ramp-type waveforms. However, in other embodiments, different types of analog waveforms/functions may be used as modulating signals.

Figure 6:
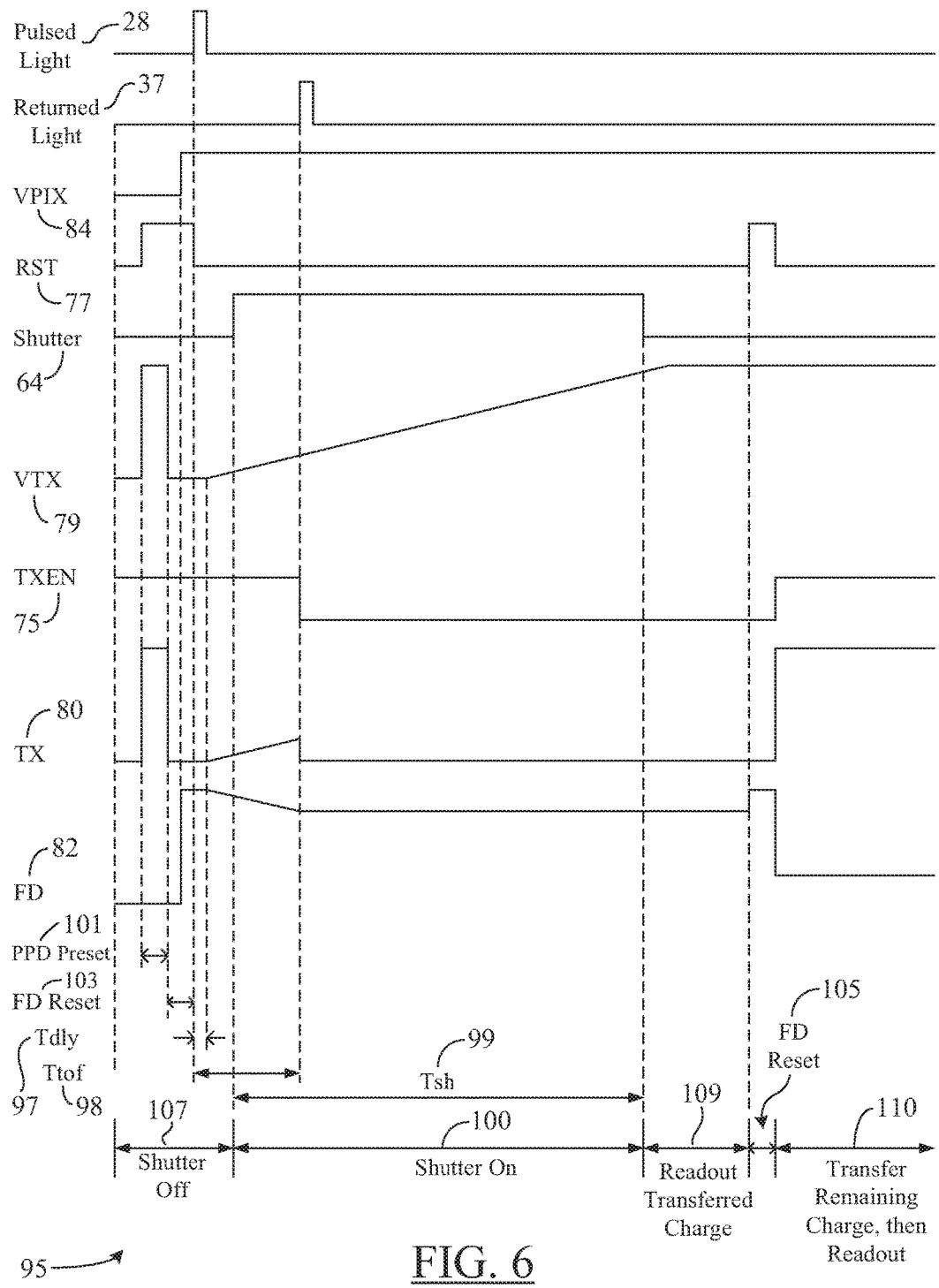
FIG. 6 is a timing diagram that shows exemplary timing of different signals in the system of FIGS. 1-2 when pixels in the embodiment of FIG. 4 are used in a pixel array for measuring TOF values according to certain embodiments of the present disclosure.

FIG. 6 is a timing diagram 95 that shows exemplary timing of different signals in the system 15 of FIGS. 1-2 when pixels 62 in the embodiment of FIG. 4 are used in a pixel array, such as the pixel array 42 in FIGS. 2 and 8, for measuring TOF values according to certain embodiments of the present disclosure. Various signals—such as the transmitted pulse 28, the VPIX input 84, the TXEN input 75, and the like—shown in the embodiments of FIGS. 2 and 4 are identified in FIG. 6 using the same reference numerals for the sake of consistency and ease of discussion. Prior to discussion FIG. 6, it is noted that, in the context of FIG. 6 (and also in case of FIG. 10), the parameter "$T_{dly}$" refers to the time delay between the rising edge of the projected pulse 28 and the time instance when the VTX signal 79 starts to ramp, as indicated by reference numeral "97"; the parameter "$T_{tof}$" refers to the pixel-specific TOF value as measured by the delay between the rising edges of the projected pulse 28 and the received pulse 37, as indicated by reference numeral "98"; and the parameter "$T_{sh}$" refers to the time period between the "opening" and the "closing" of the electronic shutter—as indicated by reference numeral "99" and given by the assertion (for example, logic 1 or "on") and de-assertion (or de-activation) (for example, logic 0 or "off") of the shutter signal 64. Thus, the electronic shutter 64 is considered to be "active" during the period "$T_{sh}$", which is also identified using the reference numeral "100." In some embodiments, the delay "$T_{dly}$" may be pre-determined and fixed regardless of operating conditions. In other embodiments, the delay "$T_{dly}$" may be adjustable at run-time depending on, for example, the external weather condition.

It is noted here that the "high" or "low" signal levels relate to the design of the pixel 62. The signal polarities or bias levels shown in FIG. 6 may be different in other types of pixel designs based on, for example, the types of transistors or other circuit components used.

As noted before, the waveforms shown in FIG. 6 (and also in FIG. 10) are simplified in nature and are for illustrative purpose only; the actual waveforms may differ in timing as well as shape depending on the circuit implementation. As shown in FIG. 6, the returned pulse 37 may be a time-wise delayed version of the projected pulse 28. In particular embodiments, the projected pulse 28 may be of a very short duration such as, for example, in the range of 5 to 10 nanoseconds (ns). The returned pulse 37 may be sensed using two or more SPADs in the pixel 62. The electronic shutter signal 64 may enable the SPADs to capture the pixel-specific photon(s) in the received light 37. The shutter signal 64 may have a gated delay—with reference to the projected pulse 28—to avoid the light scatters from reaching the pixel array 42. The light scatters of the projected pulse 28 may occur, for example, due to an inclement weather.

In addition to various external signals (for example, VPIX 84, RST 77, and the like) and internal signals (for example, TX 80, TXEN 75, and FD voltage 82), the timing diagram 95 in FIG. 6 also identifies the following events or time periods: (i) a PPD preset event 101 when RST, VTX, TXEN, and TX signals are high, while VPIX and SHUTTER signals are low; (ii) a first FD reset event 103 from when TX is low until RST turns from high to low; (iii) the delay time ($T_{dly}$) 97; (iv) the time of flight ($T_{tof}$) 98; (v) the electronic shutter "on" or "active" period ($T_{sh}$) 99; and (vi) a second FD reset event 105 for the duration of when RST is a logic 1 for a second time. FIG. 6 also illustrates when the electronic shutter is "closed" or "off" initially (which is indicated by reference numeral "107"), when the electronic shutter is "open" or "on" (which is indicated by the reference numeral "100"), when the charge initially transferred to the FD node 82 is read out through PIXOUT 60 (which is indicated by reference numeral "109"), when the FD voltage is reset a second time at arrow 105, and when the remaining charge in PPD 59 is transferred to FD 82 and again readout at event 110 (for example, as output to PIXOUT 60). In one embodiment, the shutter "on" period (Tsh) may be less than or equal to the ramping time of VTX 79.

Referring to FIG. 6, in case of the pixel 62 in FIG. 4, the PPD 59 may be filled with charge to its full well capacity at an initialization stage (for example, the PPD Preset event 101). During the PPD preset time 101, the RST, VTX, TXEN, and TX signals may be high, whereas the VPIX, SHUTTER, and TXEN signals may be low, as shown. Then, the VTX signal 79 (and, hence, the TX signal 80) may go low to shut off the second transistor 69 and the VPIX signal 84 may go high to commence the charge transfer from the "fully-charged" PPD 59. In particular embodiments, all pixels in a row of pixels in the pixel array 42 may be selected together at a time and PPDs in all of the pixels in the selected row may be reset together using the RST signal 77. Each pixel in the selected row of pixels may be read individually and the analog pixout signal may be converted to a digital value by the corresponding column ADC unit (not shown). It is noted here that, in one embodiment, the RST lines may remain high or "on" for unselected rows of pixels to prevent blooming.

In the embodiment shown in FIG. 6, all signals—except the TXEN signal 75—start at logic 0 or "low" level as shown. Initially, as mentioned above, the PPD 59 is preset when RST, VTX, TXEN, and TX go to a logic 1 level, and VPIX stays low. Thereafter, the FD node 82 is reset while RST is a logic 1, when VTX and TX go to a logic 0 and VPIX goes to high (or a logic 1). For ease of discussion, the same reference numeral "82" is used to refer to the FD node in FIG. 4 and associated voltage waveform in the timing diagram of FIG. 6. After FD is reset to high (for example, 0 C in charge domain), VTX is ramped while TXEN is a logic 1. The time of flight (Ttof) duration 98 is from when the pulsed light 28 is transmitted until the returned light 37 is received, and is also the time during which charge is transferred partially from the PPD 59 to the FD 82. The VTX input 79 (and, hence, the TX input 80) may be ramped while the shutter 64 is "on" or "open". This may cause an amount of charge in the PPD 59 to be transferred to the FD 82, which may be a function of how long VTX ramps. However, when the transmitted pulse 28 reflects off of the object 26 and is received by at least two SPADs in the pixel's 62 SPAD cores 50, the generated SPAD outputs 57 may be processed by the logic unit 66, which, in turn, may bring down the TXEN signal 75 to a static logic 0. Thus, detection of the returned light 37 by at least two adjacent SPADs in a temporally-correlated manner—that is, when the shutter is "on" or "active"—may be indicated by a logic 0 level for the TXEN signal 75. The logic low level of the TXEN input 75 turns off the first transistor 68 and the second transistor 69, which stops the transfer of charge to FD 82 from the PPD 59. When SHUTTER input 64 goes to a logic 0 and SEL input 85 (not shown in FIG. 6) goes to a logic 1, the charge in FD 82 is output as a voltage PIXOUT1 onto the PIXOUT line 60. Then, the FD node 82 may be reset again (as indicated at reference numeral "105") with a logic high RST pulse 77. Thereafter, when the TXEN signal 75 goes to a logic 1, the remaining charge in the PPD 59 is substantially completely transferred to the FD node 82 and output as a voltage PIXOUT2 onto PIXOUT line 60. As mentioned earlier, the PIXOUT1 and PIXOUT2 signals may be converted into corresponding digital values P1 and P2 by an appropriate ADC unit (not shown). In certain embodiments, these P1 and P2 values may be used in equation (2) or equation (3) above to determine a pixel-specific distance/range between the pixel 62 and the 3D object 26.

Figure 10:
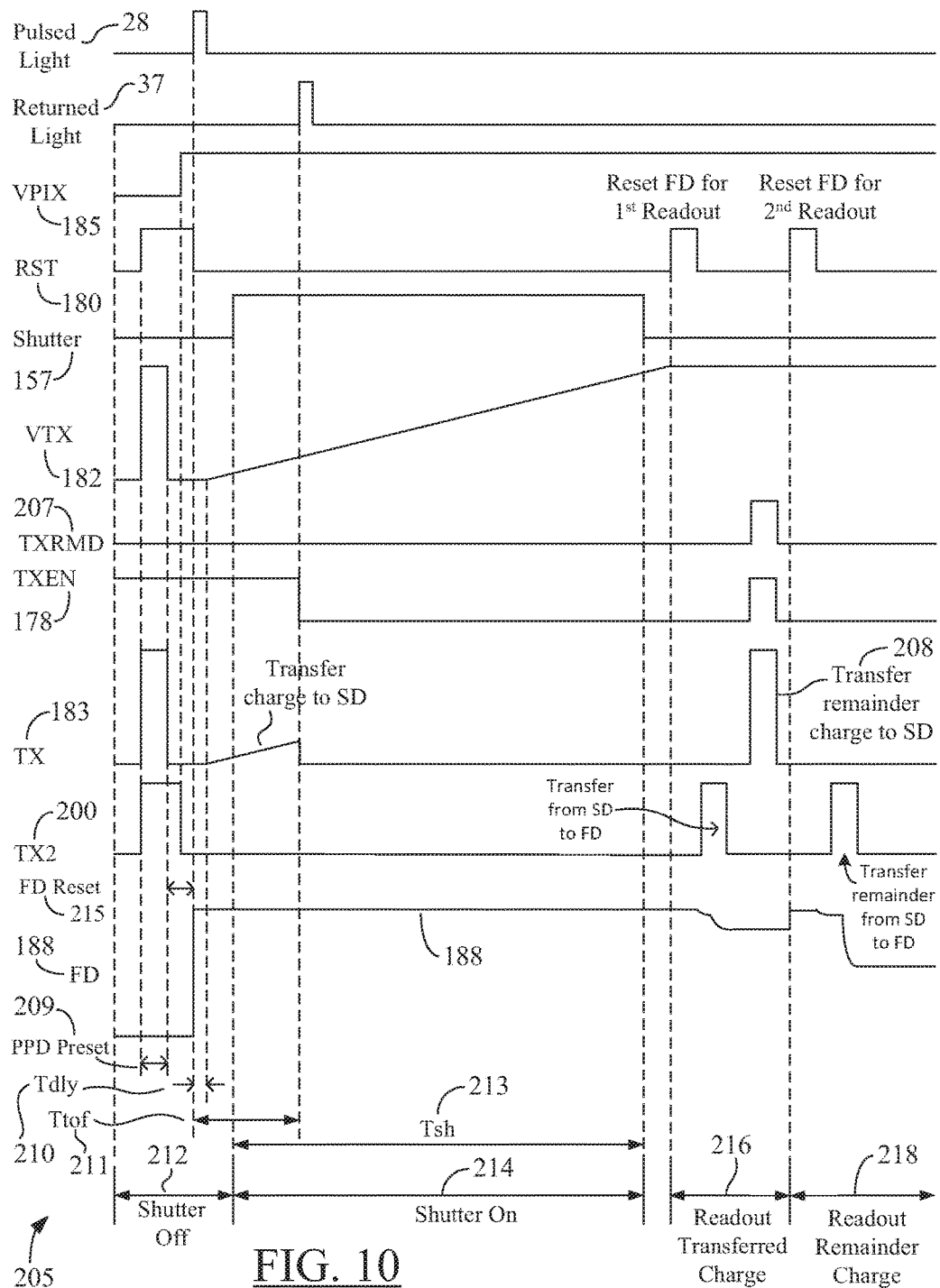
FIG. 10 is a timing diagram that shows exemplary timing of different signals in the system of FIGS. 1-2 when pixels in the embodiment of FIG. 9 are used in a pixel array for measuring TOF values according to certain embodiments of the present disclosure.

In one embodiment, the logic unit 66 may include logic circuits (not shown) to generate an output based on a G( ) function (shown and discussed with reference to FIG. 12 later below) and then logically OR the output with an internally-generated signal—such as, for example, a signal similar to the TXRMD signal 207 shown in FIG. 10—to obtain the final TXEN signal 75. Such internally-generated signal may remain low while the electronic shutter is "on", but may be asserted "high" so that the TXEN signal 75 goes to a logic 1 to facilitate the transfer of the remaining charge in the PPD (at event 110 in FIG. 6). In some embodiments, the TXRMD signal or a similar signal may be externally-supplied.

Figure 7:
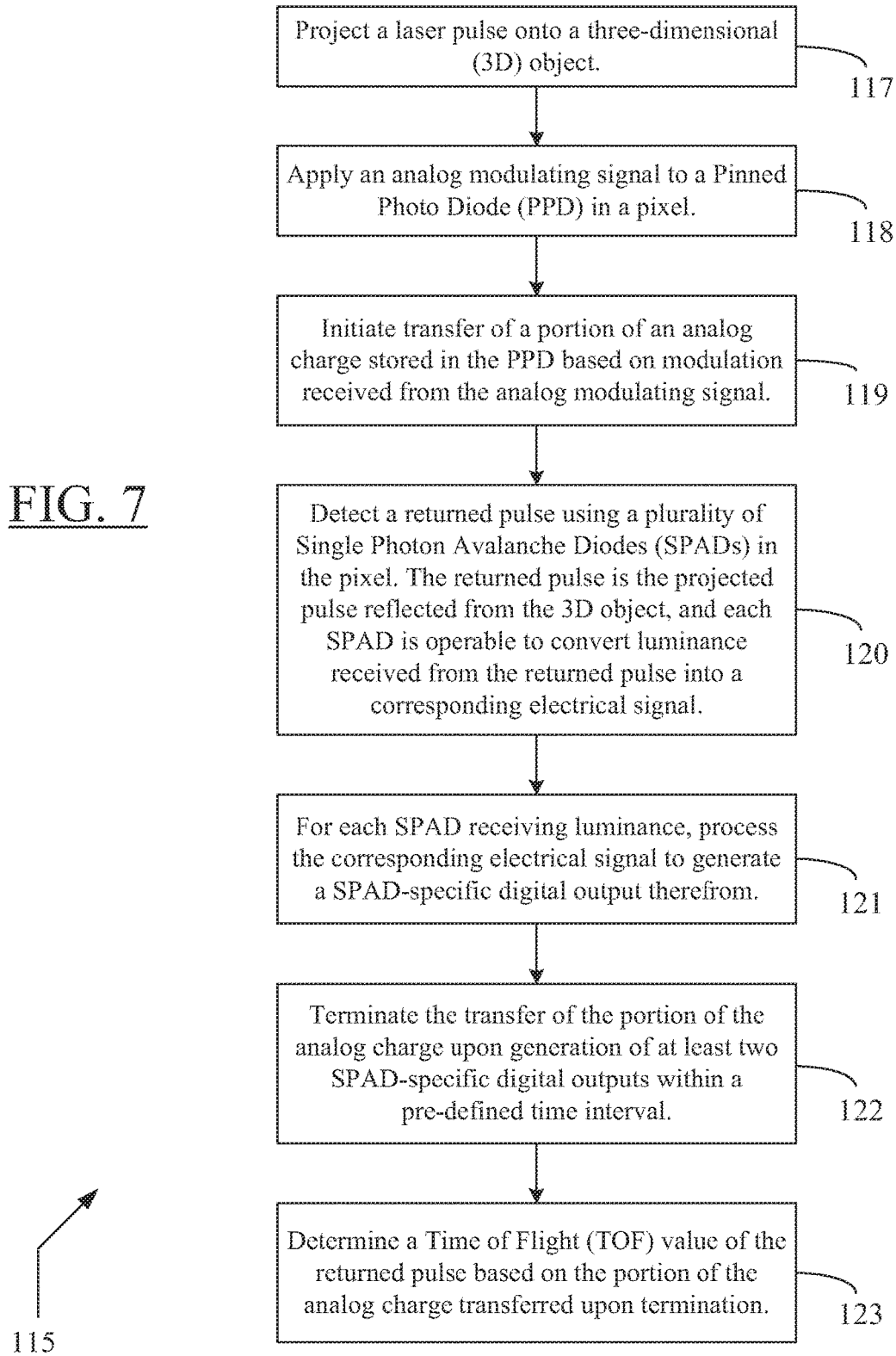
FIG. 7 depicts an exemplary flowchart showing how a TOF value may be determined in the system of FIGS. 1-2 according to one embodiment of the present disclosure.

FIG. 7 depicts an exemplary flowchart 115 showing how a TOF value may be determined in the system 15 of FIGS. 1-2 according to one embodiment of the present disclosure. Various steps illustrated in FIG. 7 may be performed by a single module or a combination of modules or system components in the system 15. In the discussion herein, by way of an example only, specific tasks are described as being performed by specific modules or system components. Other modules or system components may be suitably configured to perform such tasks as well. As noted at block 117, initially, the system 15 (more specifically, the projector module 22) may project a laser pulse, such as the pulse 28 in FIG. 2, onto a 3D object, like the object 26 in FIG. 2. At block 118, the processor 19 (or the pixel array control circuit 46 in certain embodiments) may apply an analog modulating signal, such as the VTX signal 79 in FIG. 4, to a PPD in a pixel, such as the PPD 59 in the pixel 62 in FIG. 4. As mentioned earlier, the pixel 62 may be any of the pixels 43 in the pixel array 42 in FIG. 2. At block 119, the pixel control and processing circuit 46 may initiate transfer of a portion of an analog charge stored in the PPD 59 based on modulation received from the analog modulating signal 79. To initiate such charge transfer, the pixel control circuit 46 may provide various external signals—such as the shutter signal 64, the VPIX signal 84, and the RST signal 77—to the pixel 62 at the logic levels illustrated in the exemplary timing diagram of FIG. 6. At block 120, a returned pulse, such as the returned pulse 37, may be detected using a plurality of SPADs in the pixel 62. As mentioned earlier, the returned pulse 37 is the projected pulse 28 reflected from the 3D object 26 and each SPAD (in the SPAD cores 50) in the pixel 62 is operable to convert luminance received from the returned pulse into a corresponding (SPAD-specific) electrical signal.

For each SPAD receiving luminance, the first control circuit 55 in the SPAD cores 50 in the pixel 62 may process the corresponding (SPAD-specific) electrical signal to generate a SPAD-specific digital output therefrom (block 121). All such SPAD-specific digital outputs are collectively represented by the arrow with reference numeral "57" in FIGS. 3-4. As noted with reference to discussion of FIG. 6, the logic unit 66 may process the outputs 57 and, so long as the outputs are temporally and spatially correlated, may place the TXEN signal 75 in the logic 0 (low) state. The logic 0 level of the TXEN signal 75 turns off the first transistor 68 and the second transistor 69 in the pixel 62, which stops the transfer of charge to FD 82 from the PPD 59. Thus, at block 122, the second control circuit 58 may terminate the earlier-initiated transfer of the portion of the analog charge (at block 119) upon generation of at least two SPAD-specific digital outputs with a pre-defined time interval—such as, for example, within the shutter "on" period 100 in FIG. 6.

As discussed earlier with reference to FIG. 6, the portion of the charge transferred to the FD node 82 (until the transfer is terminated at block 122) may be read out as a Pixout1 signal and converted into an appropriate digital value "P1", which may be used—along with a subsequently-generated digital value "P2" (for Pixout2 signal)—to obtain the TOF information from the ratio P1/(P1+P2), as outlined before. Thus, as noted at block 123, either the pixel control unit 46 or the processor 19 in the system 15 may determine the TOF value of the returned pulse 37 based on the portion of the analog charge transferred upon termination (at block 122).

FIG. 8 is an exemplary layout of a portion of an image sensor unit, such as the image sensor unit 24 in FIGS. 1-2, according to one embodiment of the present disclosure. The portion of the image sensor unit 24 shown in FIG. 8 may be relevant to provide the necessary signals for capturing the returned light and generating the P1 and P2 values for subsequent calculations of TOF values (from equation (1) above) and, if desired, generation of a 3D image of the remote object 26. As in case of FIG. 2, the pixel array 42 in the image sensor unit 24 in FIG. 8 is shown as having nine pixels arranged as a 3×3 array for ease of illustration only; in practice, a pixel array may contain hundreds of thousands or millions of pixels in multiple rows and columns. In particular embodiments, each pixel in the pixel array 42 may have an identical configuration and, hence, each pixel is identified using the same reference numeral "43" as shown in FIG. 8. In the embodiment of FIG. 8, the 2D pixel array 42 may be a Complementary Metal Oxide Semiconductor (CMOS) array in which each pixel 43 may be the pixel 145 shown in FIG. 9. Although the layout in FIG. 8 is with reference to the pixel configuration of FIG. 9, it is understood that the image sensor unit 24 in FIG. 8 may be suitably modified when each pixel 43 has the configuration shown in FIG. 4. In some embodiments, the pixels 43 may have configurations different from those shown in FIGS. 4 and 9, and the ancillary processing units in FIG. 8—such as the row decoder/driver 125, the column decoder 127, and the like—may be suitably modified to operate with the desired pixel configuration.

In addition to the pixel array 42, the image sensor unit 24 in the embodiment of FIG. 8 also may include a row decoder/driver 125, a column decoder 127, and a pixel column unit 128 that includes circuits for Correlated Double Sampling (CDS) as well as column-specific Analog-to-Digital Converters (ADCs) to be used during 2D and 3D imaging. In one embodiment, there may be one ADC per column of pixels. In particular embodiments, the processing units 125, 127, and 128 may be part of the pixel array control unit 46 shown in FIG. 2. In the embodiment of FIG. 8, the row decoder/driver 125 is shown to provide six (6) different signals as inputs to each pixel 43 in a row of pixels to control the operation of the pixels in the pixel array 42 and to thereby enable generation of the column-specific pixout signals 130-132. Each of the arrows 134-136 in FIG. 8 illustrates the row-specific set of these signals to be applied as inputs to each pixel 43 in the corresponding row. These signals may include: a Reset (RST) signal, a second Transfer (TX2) signal, an electronic Shutter (SH) signal, a Transfer Voltage (VTX) signal, a Pixel Voltage (VPIX) signal, and a row Select (SEL) signal. FIG. 9 illustrates how these signals may be applied to a pixel. FIG. 10 illustrates an exemplary timing diagram incorporating many of these signals.

In one embodiment, the row Select (SEL) signal may be asserted to select an appropriate row of pixels. The row decoder/driver 125 may receive the address or control information for the row to be selected via the row address/control inputs 138, for example, from the processor 19. The row decoder/driver 125 may decode the received inputs 138 to enable it to select an appropriate row using the SEL signal and to also provide the corresponding RST, VTX, and other signals to the selected/decoded row. A more detailed discussion of these signals, when applied as pixel inputs, is provided later with reference to discussion of FIGS. 9-10. In certain embodiments, the row driver unit 125 may also receive control signals (not shown), for example, from the processor 19, to configure the row driver 125 to apply appropriate voltage levels for the SEL, RST, VTX, SH, and various other signals mentioned at arrows 134-136.

The pixel column unit 128 may receive the PIXOUT signals 130-132—from the pixels in the selected row—and process them to generate pixel-specific signal values from which TOF measurements can be obtained. These signal values may be the earlier-mentioned P1 and P2 values, as illustrated by the arrow 140 in FIG. 8. Each column-specific ADC unit may process the received inputs (pixout signals) to generate the corresponding digital data outputs (P1/P2 values). More details of the CDS and ADC operations provided by the CDS and ADC circuits (not shown) in the pixel column unit 128 are provided later below with reference to FIG. 10. In the embodiment of FIG. 8, the column decoder unit 127 is shown coupled to the pixel column unit 128. The column decoder 127 may receive a column address/control input 142, for example, from the processor 19, for the column to be selected in conjunction with a given row select (SEL) signal. The column selection may be sequential, thereby allowing sequential reception of the pixel output from each pixel in the row selected by the corresponding SEL signal. The processor 19 may provide appropriate row address inputs to select the row of pixels and may also provide appropriate column address inputs to the column decoder 127 to enable the pixel column unit 128 to receive outputs (pixouts) from the individual pixels in the selected row.

FIG. 9 shows exemplary circuit details of a pixel 145 according to particular embodiments of the present disclosure. The pixel 145 in FIG. 9 is another example of the more generic pixel 43 in FIGS. 2-3. Therefore, the same reference numerals are used for the PPD core 52, the PPD 59, and the Pixout line 60 in FIGS. 3 and 9 for ease of analogy. The use of reference numerals from FIG. 3 in FIGS. 4 and 9, however, does not imply that the pixel configurations in FIGS. 4 and 9 are identical or that they employ the same circuit components. It is noted that except for having a CDS-based charge transfer (discussed later with reference to FIG. 10), the pixel 145 in FIG. 9 is substantially similar in design to the pixel 62 of FIG. 4. Hence, only a brief description of the circuit configuration in FIG. 9 is provided here for the sake of brevity.

The pixel 145 may include multiple SPAD cores—SPAD core 1 through SPAD core N (where, N≥2)—as part of its SPAD cores 50 (FIG. 3). In FIG. 9, two such SPAD cores 147-148 are shown with their circuit details. It is noted that, in some embodiments, similar circuits may be employed for the SPAD cores in the pixel 62 in FIG. 4. The SPAD core 147 may include a SPAD 150 receiving a SPAD operating voltage (VSPAD) 151 through a resistive element (such as a resistor) 152. However, the present disclosure is not limited to the arrangement of resistor 152 and the SPAD 150 as shown. In one embodiment, the positions of the resistor 152 and the SPAD 150 may be swapped. In the pixel 145, the SPAD 150 responds to light. When the SPAD 150 receives a photon, the SPAD 150 outputs a pulse that goes from the level of VSPAD to 0V and back to VSPAD. The output from the SPAD 150 may be filtered through a capacitor 153 and applied to an inverter 154 (which may function as a combination of a buffer and a latch). In one embodiment, the capacitor 153 may be eliminated. The SPAD core 147 may include a PMOS transistor 155 that receives an electronic shutter signal 157 at its gate terminal, whereas the drain terminal of the transistor 155 is connected to the capacitor (and input of the inverter 154) and the source terminal of the transistor 155 may receive the supply voltage VDD 156 (or the VPIX voltage, in some embodiments). When the shutter signal 157 is turned off (for example, logic 0 or "low" level), the transistor 155 conducts and the output 159 of the inverter 154 may remain at a fixed voltage level (for example, in the logical "low" or logic 0 state) regardless of the status of any outputs received from the SPAD 150. An output from the SPAD 150 may be applied to the PPD core 52 only when the shutter signal 157 is turned on or "active." When the shutter is active (for example, logic 1 level), the transistor 155 is turned off and, hence, the SPAD-generated output may be transmitted to the inverter 154 (via the coupling capacitor 153) and may appear as a positive pulse (low-to-high) on the output line 159.

The SPAD core 148 is identical to the SPAD core 147 in circuit details and, hence, operational details of the SPAD core 148 is not provided. As shown, the SPAD core 148 may include a core-specific SPAD 160, a resistive element 162 through which the VSPAD voltage 151 is supplied to the SPAD 160, a coupling capacitor 163, an inverter 164 for latching and outputting the output generated by the SPAD 160, and a PMOS transistor 165 to control the operation of the inverter 164 through the shutter input 157. The output 167 of the inverter 164 may be provided to the PPD core 52 for further processing. In some embodiments, the signals VSPAD 151, VDD 156, and shutter 157 may be supplied to each SPAD core 147-148 from an external unit, such as, for example, the row decoder/driver unit 125 shown in FIG. 8 or any other module (not shown) in the pixel control unit 46 (or the processor 19) in FIG. 2. All of the SPAD core-specific outputs 159, 167 may collectively form the signals identified using the reference numeral "57" in FIG. 3.

Thus, the electronic shutter signal 157 ensures that outputs 159, 167 from the SPAD cores 147-148 are temporally (or, time-wise) correlated in addition to being spatially correlated due to adjacent locations of SPAD cores 147-148 in the pixel 145. Additional pixel geometries are shown in the exemplary embodiments of FIGS. 11A-11C, which are discussed later below.

Like the pixel 62 in FIG. 4, the pixel 145 in FIG. 9 also includes the PPD 59, a logic unit 170, a first NMOS transistor 172, a second NMOS transistor 173, a third NMOS transistor 174, a fourth NMOS transistor 175, a fifth NMOS transistor 176; generates the internal input TXEN 178; receives external inputs RST 180, VTX 182 (and, hence, the TX signal 183), VPIX 185, and SEL 186; has an FD node 188; and outputs the PIXOUT signal 60. However, unlike the pixel 62 in FIG. 4, the pixel 145 in FIG. 9 also generates a second TXEN signal (TXENB) 190, which may be a complement of the TXEN signal 178 and may be supplied to the gate terminal of a sixth NMOS transistor 192. The sixth NMOS transistor 192 may have its drain terminal connected to the source terminal of the transistor 172 and its source terminal connected to a Ground (GND) potential 193. The TXENB signal 190 may be used to bring the GND potential to the gate terminal of the TX transistor 173. Without the TXENB signal 190, when the TXEN signal 178 goes low, the gate of the TX transistor 173 may be floating and the charge transfer from the PPD 59 may not be fully terminated. This situation may be ameliorated using the TXENB signal 190. Additionally, the pixel 145 also may include a Storage Diffusion (SD) capacitor 195 and a seventh NMOS transistor 197. The SD capacitor 195 may be connected at the junction of the drain terminal of the transistor 173 and the source terminal of transistor 197, and may "form" an SD node 199 at the junction. The seventh NMOS transistor 197 may receive at its gate terminal a different, second Transfer signal (TX2) 200 as an input. The drain of the transistor 197 may connect to the FD node 188 as illustrated.

As mentioned with reference to FIG. 8, in some embodiments, the signals RST, VTX, VPIX, TX2, and SEL may be supplied to the pixel 145 from an external unit, such as, for example, the row decoder/driver unit 125 shown in FIG. 8. Furthermore, in certain embodiments, the SD capacitor 195 may not be an extra capacitor, but may be merely the junction capacitor of the SD node 199. A comparison of FIG. 3 and FIG. 9 shows that, in pixel 145, all of the SPADs 150, 160, and so on, collectively form the SPADs block 54 in FIG. 3; all non-SPAD circuit elements from each SPAD core 147, 148, and so on, collectively form the first control circuit 55 in FIG. 3; and all non-PPD circuit elements in the PPD core 52 form the second control circuit 58 in FIG. 3.

In the pixel 145, the charge transfer trigger portion may include the SPAD cores 147-148 (and other such cores) and the logic unit 170; the charge generation and transfer portion may include the PPD 59, the NMOS transistors 172-174, 192, and 197, and the SD capacitor 195; and the charge collection and output portion may include the NMOS transistors 174-176. It is noted here that separation of various circuit components into respective portions is for illustrative and discussion purpose only. In certain embodiments, such portions may include more or less or different circuit elements than those listed here.

As mentioned before, except for the CDS-based charge collection and output, the pixel configuration in FIG. 9 is substantially similar to that in FIG. 4. Therefore, for the sake of brevity, the circuit portions and signals common between the embodiments in FIGS. 4 and 9—such as the transistors 172-176 and associated inputs like RST, SEL, VPIX, and so on—are not discussed here. It is understood that the CDS is a noise reduction technique for measuring an electrical value, such as a pixel/sensor output voltage (pixout), in a manner that allows removal of an undesired offset. In particular embodiments, a column-specific CDS unit (not shown) may be employed in the pixel column unit 128 (FIG. 8) to perform correlated double sampling. In CDS, the output(s) of a pixel, such as the pixel 145 in FIG. 9, may be measured twice—once in a known condition, and once in an unknown condition. The value measured from the known condition may be then subtracted from the value measured from the unknown condition to generate a value with a known relation to the physical quantity being measured—here, the PPD charge representing the pixel-specific portion of the received light. Using CDS, noise may be reduced by removing the reference voltage of the pixel (such as, for example, the pixel's voltage after it is reset) from the signal voltage of the pixel at the end of each charge transfer. Thus, in CDS, before the charge of a pixel is transferred as an output, the reset/reference value is sampled, which is then "deducted" from the value after the charge of the pixel is transferred.

In the embodiment of FIG. 9, the SD capacitor 195 (or the associated SD node 199) stores the PPD charge prior to its transfer to the FD node 188, thereby allowing the establishment (and sampling) of appropriate reset values at the FD node 188 prior to any charge is transferred to the FD node 188. As a result, each pixel-specific output (Pixout1 and Pixout2) may be processed in a column-specific CDS unit (not shown) in the pixel column unit 128 (FIG. 8) to obtain a pair of pixel-specific CDS outputs. Subsequently, the pixel-specific CDS outputs may be converted to digital values—here, the P1 and P2 values indicated by arrow 140 in FIG. 8—by the respective column-specific ADC unit (not shown) in the pixel column unit 128. The transistors 192 and 197, and the signals TXENB 190 and TX2 200 in FIG. 9 provide ancillary circuit components needed to facilitate CDS-based charge transfer. In one embodiment, the P1 and P2 values may be generated in parallel using, for example, an identical pair of ADC circuits as part of the column-specific ADC unit. Thus, the differences between the reset levels and corresponding PPD charge levels of pixout1 and pixout2 signals may be converted to digital numbers by a column parallel ADC and output as the pixel-specific signal values—P1 and P2—to enable the computation of the pixel-specific TOF value of the returned pulse 37 for the pixel 145 based on the equation (1) given before. As noted earlier, such computation may be performed by the pixel array processing unit 46 itself or by the processor 19 in the system 15. Consequently, a pixel-specific distance to the 3D object 26 (FIG. 2) also may be determined using, for example, equation (2) or equation (3). The pixel-by-pixel charge collection operation may repeat for all the rows of pixels in the pixel array 42. Based on all the pixel-specific distance or range values for the pixels 43 in the pixel array 42, a 3D image of the object 26 may be generated, for example, by the processor 19, and displayed on an appropriate display or user interface associated with the system 15. Furthermore, a 2D image of the 3D object 26 may be generated—for example, when no range values are calculated or when a 2D image is desired despite the availability of range values—by simply adding the P1 and P2 values. In particular embodiments, such a 2D image simply may be a grayscale image, for example, when an IR laser is used.

It is observed here that the pixel configurations shown in FIGS. 4 and 9 are exemplary only. Other types of PPD-based pixels with multiple SPADs also may be used to implement the teachings of the present disclosure. Such pixels may include, for example, pixels having a single output (such as the PIXOUT line 60 in the embodiments of FIGS. 4 and 9) or pixels with dual outputs where Pixout1 and Pixout2 signals may be output through different outputs in the pixel.

FIG. 10 is a timing diagram 205 that shows exemplary timing of different signals in the system 15 of FIGS. 1-2 when pixels 145 in the embodiment of FIG. 9 are used in a pixel array, such as the pixel array 42 in FIGS. 2 and 8, for measuring TOF values according to certain embodiments of the present disclosure. The timing diagram 205 in FIG. 10 is similar to the timing diagram 95 in FIG. 6—especially with reference to the waveforms of VTX, Shutter, VPIX, and TX signals, and identification of various timing intervals or events such as, for example, the PPD reset event, the shutter "on" period, the time delay period ($T_{dly}$), and so on. Because of the earlier extensive discussion of the timing diagram 95 in FIG. 6, only a brief discussion of the distinguishing features in the timing diagram 205 in FIG. 10 is provided for the sake of brevity.

In FIG. 10, for the sake of consistency and ease of discussion, various externally-supplied signals—here, the VPIX signal 185, the RST signal 180, the electronic shutter signal 157, the analog modulating signal VTX 182, and the TX2 signal 200—and the internally-generated TXEN signal 178 are identified using the same reference numerals as those used for these signals in FIG. 9. Similarly, for ease of discussion, the same reference numeral "188" is used to refer to the FD node in FIG. 9 and associated voltage waveform in the timing diagram of FIG. 10. A Transfer Mode (TXRMD) signal 207 is shown in FIG. 10, but not shown in FIG. 9 or in the earlier timing diagram of FIG. 6. In particular embodiments, the TXRMD signal 207 may be internally generated by the logic unit 170 or externally-supplied to the logic unit 170 by a row decoder/driver (such as the row decoder/driver 125 in FIG. 8). In one embodiment, the logic unit 170 may include logic circuits (not shown) to generate an output based on a G( ) function (shown and discussed with reference to FIG. 12 later below) and then logically OR the output with an internally-generated signal—such as, for example, the TXRMD signal 207—to obtain the final TXEN signal 178. As shown in FIG. 10, in one embodiment, such internally-generated TXRMD signal 207 may remain low while the electronic shutter is "on", but may be asserted "high" thereafter so that the TXEN signal 178 goes to a logic 1 to facilitate the transfer of the remaining charge in the PPD (at event 208 in FIG. 10).

It is noted that the PPD reset event 209, the delay time ($T_{dly}$) 210, the TOF period ($T_{tof}$) 211, the shutter "off" interval 212, and the shutter "on" or "active" period ($T_{sh}$) 213 or 214, and the FD reset event 215 in FIG. 10 are similar to corresponding events or time periods shown in FIG. 6. Therefore, additional discussion of these parameters is not provided for the sake of brevity. Initially, the FD reset event 215 results in the FD signal 188 going "high", as shown. The SD node 199 is reset to "high" after the PPD 59 is preset to "low". More specifically, during the PPD preset event 209, the TX signal 183 may be "high", the TX2 signal 200 may be "high", the RST signal 180 may be "high", and the VPIX signal 185 may be "low" to fill electrons to PPD 59 and preset it to zero volt. Thereafter, the TX signal 183 may go "low" but the TX2 signal 200 and the RST signal 180 may briefly remain "high", which, along with a "high" VPIX signal 185, may reset the SD node 199 to "high" and remove electrons from the SD capacitor 195. In the meantime, the FD node 188 is reset as well (following the FD reset event 215). The voltage at the SD node 199 or the SD reset event are not shown in FIG. 10.

In contrast to the embodiment in FIGS. 4 and 6, the PPD charge is amplitude modulated and initially transferred to the SD node 199 (through the SD capacitor 195) in the embodiment of FIGS. 9-10 when the shutter 157 is "active" and the VTX signal 182 is ramped up—as noted on the TX waveform 183. Upon detection of photons by at least two SPADs in the pixel 145 (FIG. 9) during the shutter "on" period 214, the TXEN signal 178 goes "low" and the initial charge transfer from the PPD 59 to the SD node 199 stops. The transferred charge stored at the SD node 199 may be read out on the Pixout line 60 (as a Pixout1 output) during the first readout period 216. In the first readout period 216, the RST signal 180 may be briefly asserted "high" after the electronic shutter 157 is de-activated or turned "off" to reset the FD node 188. Thereafter, the TX2 signal 200 may be pulsed "high" to transfer the charge from the SD node 199 to the FD node 188 while TX2 is "high". The FD voltage waveform 188 illustrates this charge transfer operation. The transferred charge then may be readout (as Pixout1 voltage) during the first readout period 216 via the Pixout line 60 using the SEL signal 186 (not shown in FIG. 10).

During the first readout interval 216, after the initial charge is transferred from the SD node to the FD node and the TX2 signal 200 returns to the logic "low" level, the TXRMD signal 207 may be asserted (pulsed) "high" to generate a "high" pulse on the TXEN input 178, which, in turn, may generate a "high" pulse on the TX input 183 to allow transfer of the remaining charge in the PPD 59 to the SD node 199 (through the SD capacitor 195)—as indicated by the reference numeral "208" in FIG. 10. Thereafter, the FD node 188 may be reset again when the RST signal 180 is briefly asserted "high" again. The second RST high pulse may define a second readout period 218, in which the TX2 signal 200 may be pulsed "high" again "to transfer the PPD's remainder charge (at event 208) from the SD node 199 to the FD node 188 while TX2 is "high". The FD voltage waveform 188 illustrates this second charge transfer operation. The transferred remaining charge then may be readout (as Pixout2 voltage) during the second readout period 218 via the Pixout line 60 using the SEL signal 186 (not shown in FIG. 10). As mentioned earlier, the PIXOUT1 and PIXOUT2 signals may be converted into corresponding digital values P1 and P2 by an appropriate ADC unit (not shown). In certain embodiments, these P1 and P2 values may be used in equation (2) or equation (3) above to determine a pixel-specific distance/range between the pixel 145 and the 3D object 26. The SD-based charge transfer illustrated in FIG. 10 allows for a generation of a pair of pixel-specific CDS outputs, as discussed earlier with reference to discussion of FIG. 9. The CDS-based signal processing provides for additional noise reduction, as also mentioned before.

Figure 11A:
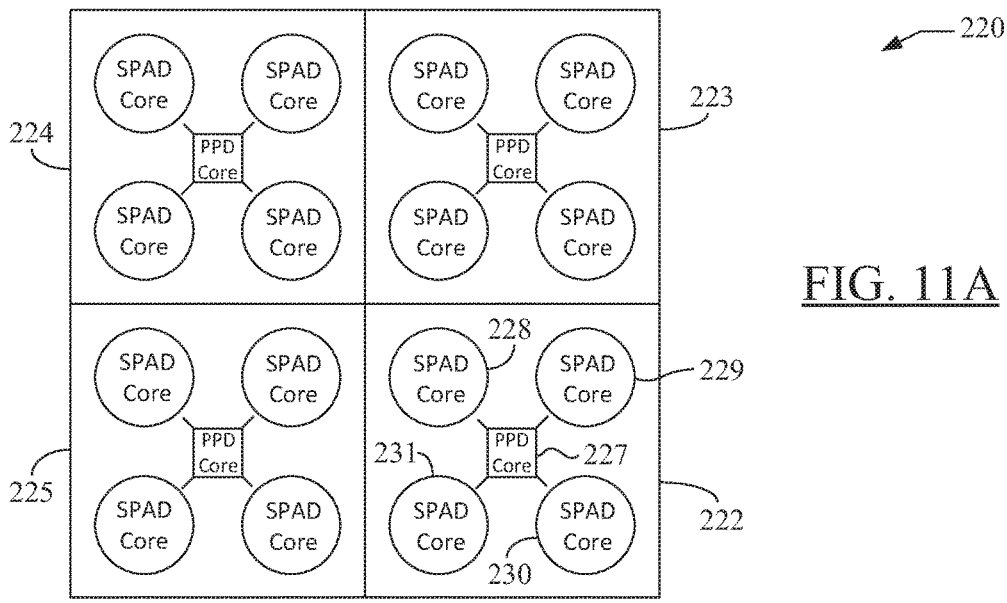
FIGS. 11A-11C illustrate three examples of pixel array architectures as per particular embodiments of the present disclosure.
Figure 11B:
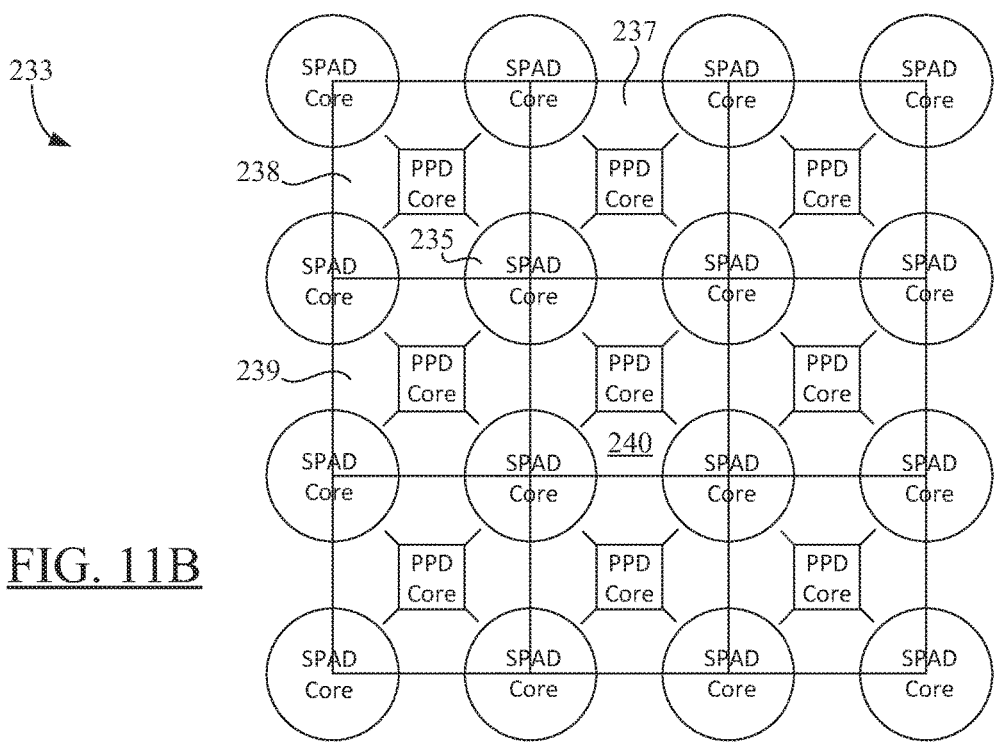
Figure 11C:
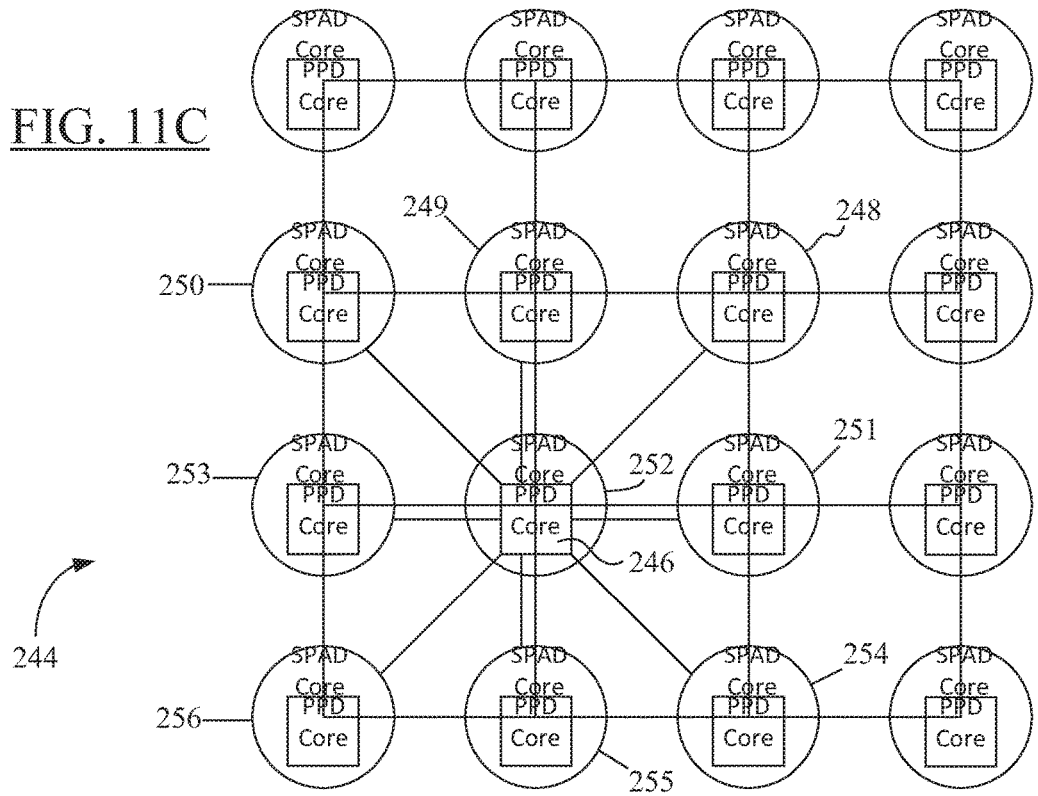

FIGS. 11A-11C illustrate three examples of pixel array architectures as per particular embodiments of the present disclosure. Any of the pixel array architectures shown in FIGS. 11A-11C may be used to implement the pixel array 42 in FIG. 2. In FIG. 11A, an exemplary 2×2 pixel array 220 is shown in which each pixel 222-225 (which may represent the pixel 43 in FIG. 3 in some embodiments) includes one pixel-specific PPD core and four pixel-specific SPAD cores. For simplicity of drawing, such PPD and SPAD cores are identified only for the pixel 222, where the PPD core is identified with reference numeral "227" and the SPAD cores are identified by reference numerals "228" through "230." The architecture shown in FIG. 11A may be considered a low (spatial) resolution architecture because of the physical space occupied by each pixel on the semiconductor die of a given size. As a result, a reduced number of pixels may be formed in a pixel array on the die as compared to the architecture in FIG. 11B, which shows a high resolution architecture with an exemplary 3×3 pixel array 233. In the high resolution architecture in FIG. 11B, one SPAD core is shared by four (2×2) adjacent PPD cores. For example, in FIG. 11B, the SPAD core 235 is shown shared by PPD cores of adjacent pixels 237, 238, 239, and 240 (each of which may represent the pixel 43 in FIG. 3 in some embodiments). Again, for simplicity of drawing, other components in the pixel array 233 in FIG. 11B are not identified with reference numerals. It is observed from the configuration 233 in FIG. 11B that the sharing of a SPAD among four adjacent pixels results in an effective ratio of 1:1 between a PPD in a pixel and the SPADs associated with the pixel. Such sharing may be extended to be 3×3 sharing (as shown in FIG. 11C) or more. The SPAD-sharing configuration in FIG. 11B results in a high (spatial) resolution architecture for a pixel array because more pixels may be formed in the pixel array when each SPAD is shared among neighboring pixels on the die, thereby releasing more space on the die to accommodate more pixels. Furthermore, because a pixel in the array 233 in FIG. 11B has a single PPD core associated with four SPAD cores in a 2×2 configuration, up to four (4) coincident photons may be detected by each pixel—one photon per SPAD.

It is noted that FIGS. 11A and 11B illustrate configurations in which PPDs and SPADs are realized in a single die—that is, SPADs and PPDs are on the same level in the die. In contrast, FIG. 11C shows an exemplary 4×4 pixel array 244 in which the pixels are realized in stacked dies—for example, the SPAD cores in an upper die and the PPD cores (and readout circuits) in a lower die. Thus, PPDs and SPADs may be on two different dies, which can be stacked and circuit elements (PPDs, SPADs, transistors, and the like) on these dies may be electrically connected by wires or metal bumps. Like the embodiment in FIG. 11B, the pixel configuration 244 in FIG. 11C also provides a high resolution architecture where a single SPAD core may be shared by nine (3×3) adjacent PPD cores. Equivalently, as shown in FIG. 11C, a single PPD core—such as the PPD core 246—may be associated with nine (9) SPAD cores—such as the SPAD cores 248-256—to form a single pixel. These SPAD cores 248-256 also may be shared by other pixels. For simplicity of the drawing, other pixels, their PPD cores, and associated SPAD cores are not identified with reference numerals in FIG. 11C. Furthermore, because a pixel in the array 244 in FIG. 11C has a single PPD core associated with nine SPAD cores in a 3×3 configuration, up to nine (9) coincident photons may be detected by each pixel—one photon per SPAD.

Figure 12:
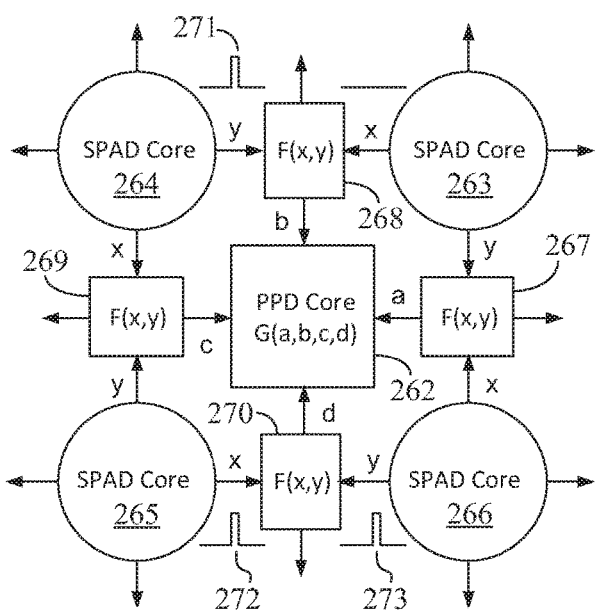
FIG. 12 shows how a logic unit may be implemented in a pixel according to particular embodiments of the present disclosure.

FIG. 12 shows how a logic unit, such as the logic unit 66 (FIG. 4) or the logic unit 170 (FIG. 9), may be implemented in a pixel, such as the pixel 62 (FIG. 4) or the pixel 145 (FIG. 9), according to particular embodiments of the present disclosure. FIG. 12 shows a highly simplified diagram of a pixel 260 (which may represent any of the pixels 62 or 145) having a PPD core 262 associated with four SPAD cores 263-266 in a 2×2 configuration like that shown in FIG. 11A or FIG. 11B. The availability of four SPADs thus allows for detection of up to four (4) coincident photons (which are temporally and spatially correlated)—one photon per SPAD. In particular embodiments, the logic unit (not shown) in the pixel 260 may include logic circuits (not shown) that implement the functions F(x,y) and G(a,b,c,d) shown in FIG. 12. The blocks 267-270 in FIG. 12 illustrate the inputs and outputs of the logic circuits implementing the F(x,y) function. Thus, the blocks 267-270 may be considered to represent such logic circuits and to collectively form a part of the logic unit of the pixel 260. For ease of discussion, these blocks are referred to as "F(x,y) blocks". Furthermore, although the blocks 267-270 are shown external to the PPD core 262 for ease of illustration, it is understood that the logic circuits implementing the functionalities of the blocks 267-270 may be a part of the logic unit (not shown) in the PPD core 262.

As shown, each F(x,y) block 267-270 may receive two inputs "x" and "y"—one input from each of its two associated SPAD cores. In the context of FIGS. 3-4, such inputs may be in the form of the output signals 57 from the SPAD cores 50. In the context of FIG. 9, the SPAD outputs 159, 167 may represent the requisite "x", "y" inputs to such F(x,y) blocks in the logic unit 170. Similar two-input F(x,y) blocks per pair of SPAD cores may be devised for pixels having more than four SPAD cores associated with a PPD core, such as, for example, the pixel array configuration 244 in FIG. 11C. In particular embodiments, all of the F(x,y) blocks 267-270 may be consolidated and implemented through a single F(x,y) unit in the PPD core 262 that contains logic circuits configured to operate on different pairs of SPAD outputs—as its "x" and "y" inputs—to implement the functionality of individual F(x,y) blocks 267-270. As noted before, the TOF measurement as per teachings of the present disclosure is based on detection of spatially- and temporally-correlated photons by at least two SPADs in a pixel. Thus, as noted in FIG. 12, each F(x,y) block 267-270 (more specifically, the logic circuit in an F(x,y) block) may be configured to perform the following pre-defined operations: (i) a logical NAND operation on its respective inputs "x" and "y"—given by (x*y)—to detect two or four coincident photons, and (ii) a logical NOR operation on its respective inputs "x" and "y"—given by (x+y)—to detect three coincident photons. Thus, the logic circuit implementing the F(x,y) blocks 267-270 may perform the logical NAND operation when signals 57 (FIG. 3) from the SPAD cores 263-266 indicate that two (or all four) SPADs have detected photons during the shutter "on" period. Similarly, a logical NOR operation may be selected when signals 57 from the SPAD cores 263-266 indicate that three SPADs have detected photons during the shutter "on" period. In the exemplary illustration in FIG. 12, three pulses 271-273 are shown to represent the case of detection of three coincident photons when each of the three SPAD cores 264-266 detects the incoming light—such as the returned pulse 37 (FIG. 2).

Referring again to FIG. 12, the output of each F(x,y) block 267-270 is shown using the corresponding reference letter "a," "b," "c", and "d". The logic unit (not shown) in the PPD core 262 also may include an additional logic circuit (not shown) to receive and process these outputs "a" through "d". The logic circuit may receive all four of these outputs as inputs thereto and operate on them according a pre-defined logic function "G(a,b,c,d)". For example, as indicated in FIG. 12, in case of detection of two (2) coincident photons, the G( ) function may perform a logical NAND operation—given by (a*b*c*d)—on all four of its inputs "a" through "d." On the other hand, in case of detection of three (3) or four (4) coincident photons, the G( ) function may perform a logical NOR operation—given by (a+b+c+d)—on all four of its inputs "a" through "d." In one embodiment, the TXEN signal—such as the TXEN signal 75 in FIG. 4 or the TXEN signal 178 in FIG. 9—may be the output of the logic circuit implementing the G( ) function. In another embodiment, the output of the logic circuit for the G( ) function may be ORed with an internally-generated signal—such as, for example, the TXRMD signal 207 in FIG. 10—to obtain the final TXEN signal.

In summary, the present disclosure uses a PPD in a pixel as a time-to-charge converter whose AM-based charge transfer operation is controlled by outputs from multiple adjacent SPADs in the pixel to determine TOF. When the ambient light is high, there may be a high probability that a SPAD is triggered by an ambient photon instead of a reflected photon (for example, in the reflected pulse 37). A reliance on such triggering may cause a range measurement error. Therefore, in the present disclosure, the PPD charge transfer is stopped to record TOF only when two or more SPADs are triggered within a very short, pre-defined time interval—such as, for example, when an electronic shutter is "on." As a result, an all-weather autonomous navigation system as per teachings of the present disclosure may provide improved vision for drivers under difficult driving conditions such as, for example, low light, fog, bad weather, strong ambient light, and so on. In some embodiments, the navigation system as per teachings of the present disclosure may have high ambient light rejection level of up to 100 kilo lux (100 kLux). In particular embodiments, a high spatial resolution pixel architecture with smaller pixel size may be provided with SPAD to PPD ratio of 1:1. In some embodiments, the SPADs can be biased below their breakdown voltage and be used in an Avalanche Photo Diode (APD) mode.

Figure 13:
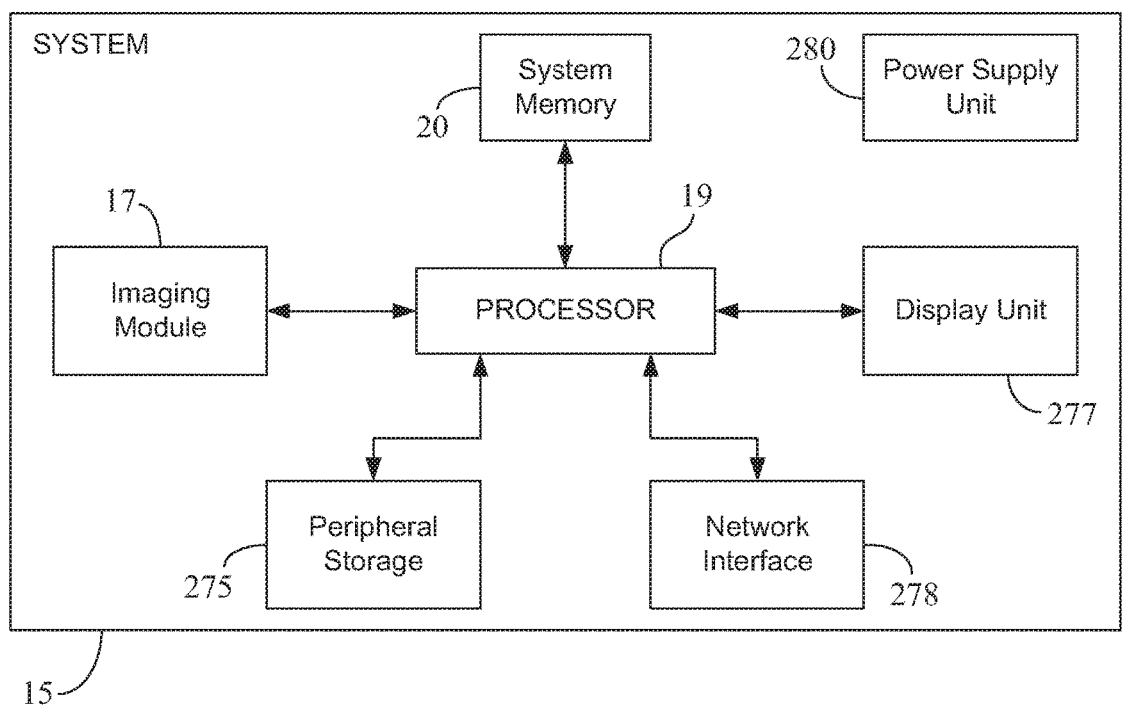
FIG. 13 depicts an overall layout of the system in FIGS. 1-2 according to one embodiment of the present disclosure.

FIG. 13 depicts an overall layout of the system 15 in FIGS. 1-2 according to one embodiment of the present disclosure. Hence, for ease of reference and discussion, the same reference numerals are used in FIGS. 1-2 and 13 for the common system components/units.

As discussed earlier, the imaging module 17 may include the desired hardware shown in the exemplary embodiments of FIG. 2-3, 4 (or 9) to accomplish 2D/3D imaging and TOF measurements as per the inventive aspects of the present disclosure. The processor 19 may be configured to interface with a number of external devices. In one embodiment, the imaging module 17 may function as an input device that provides data inputs—in the form of processed pixel outputs such as, for example, the P1 and P2 values in FIG. 8—to the processor 19 for further processing. The processor 19 may also receive inputs from other input devices (not shown) that may be part of the system 15. Some examples of such input devices include a computer keyboard, a touchpad, a touch-screen, a joystick, a physical or virtual "clickable button," and/or a computer mouse/pointing device. In FIG. 13, the processor 19 is shown coupled to the system memory 20, a peripheral storage unit 275, one or more output devices 277, and a network interface unit 278. In FIG. 13, a display unit is shown as an output device 277. In some embodiments, the system 15 may include more than one instance of the devices shown. Some examples of the system 15 include a computer system (desktop or laptop), a tablet computer, a mobile device, a cellular phone, a video gaming unit or console, a machine-to-machine (M2M) communication unit, a robot, an automobile, a virtual reality equipment, a stateless "thin" client system, a car's dash-cam or rearview camera system, an autonomous navigation system, or any other type of computing or data processing device. In various embodiments, all of the components shown in FIG. 13 may be housed within a single housing. Thus, the system 15 may be configured as a standalone system or in any other suitable form factor. In some embodiments, the system 15 may be configured as a client system rather than a server system. In particular embodiments, the system 15 may include more than one processor (e.g., in a distributed processing configuration). When the system 15 is a multiprocessor system, there may be more than one instance of the processor 19 or there may be multiple processors coupled to the processor 19 via their respective interfaces (not shown). The processor 19 may be a System on Chip (SoC) and/or may include more than one Central Processing Unit (CPU).

As mentioned earlier, the system memory 20 may be any semiconductor-based storage system such as, for example, DRAM, SRAM, PRAM, RRAM, CBRAM, MRAM, STT-MRAM, and the like. In some embodiments, the memory unit 20 may include at least one 3DS memory module in conjunction with one or more non-3DS memory modules. The non-3DS memory may include Double Data Rate or Double Data Rate 2, 3, or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 20 may include multiple different types of semiconductor memories, as opposed to a single type of memory. In other embodiments, the system memory 20 may be a non-transitory data storage medium.

The peripheral storage unit 275, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, and the like. In some embodiments, the peripheral storage unit 275 may include more complex storage devices/systems such as disk arrays (which may be in a suitable RAID (Redundant Array of Independent Disks) configuration) or Storage Area Networks (SANs), and the peripheral storage unit 275 may be coupled to the processor 19 via a standard peripheral interface such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 277 may be an example of an output device. Other examples of an output device include a graphics/display device, a computer screen, an alarm system, a CAD/CAM (Computer Aided Design/Computer Aided Machining) system, a video game station, a smartphone display screen, a dashboard-mounted display screen in an automobile, or any other type of data output device. In some embodiments, the input device(s), such as the imaging module 17, and the output device(s), such as the display unit 277, may be coupled to the processor 19 via an I/O or peripheral interface(s).

In one embodiment, the network interface 278 may communicate with the processor 19 to enable the system 15 to couple to a network (not shown). In another embodiment, the network interface 278 may be absent altogether. The network interface 278 may include any suitable devices, media and/or protocol content for connecting the system 15 to a network—whether wired or wireless. In various embodiments, the network may include Local Area Networks (LANs), Wide Area Networks (WANs), wired or wireless Ethernet, telecommunication networks, satellite links, or other suitable types of networks.

The system 15 may include an on-board power supply unit 280 to provide electrical power to various system components illustrated in FIG. 13. The power supply unit 280 may receive batteries or may be connectable to an AC electrical power outlet or an automobile-based power outlet. In one embodiment, the power supply unit 280 may convert solar energy or other renewable energy into electrical power.

In one embodiment, the imaging module 17 may be integrated with a high-speed interface such as, for example, a Universal Serial Bus 2.0 or 3.0 (USB 2.0 or 3.0) interface or above, that plugs into any Personal Computer (PC) or laptop. A non-transitory, computer-readable data storage medium, such as, for example, the system memory 20 or a peripheral data storage unit such as a CD/DVD may store program code or software. The processor 19 and/or the pixel array control unit 46 (FIG. 2) in the imaging module 17 may be configured to execute the program code, whereby the device 15 may be operative to perform the 2D imaging (for example, grayscale image of a 3D object), TOF and range measurements, and generation of a 3D image of an object using the pixel-specific distance/range values, as discussed hereinbefore—such as, for example, the operations discussed earlier with reference to FIGS. 1-12. For example, in certain embodiments, upon execution of the program code, the processor 19 and/or the control unit 46 may suitably configure (or activate) relevant circuit components—such as the row decoder/driver 125 and the pixel column unit 128 in FIG. 8—to apply appropriate input signals, like the Shutter, RST, VTX, SEL signals, and so on, to the pixels 43 in the pixel array 42 to enable capture of the light from a returned laser pulse and to subsequently process the pixel outputs for pixel-specific P1 and P2 values needed for TOF and range measurements. The program code or software may be proprietary software or open source software which, upon execution by the appropriate processing entity—such as the processor 19 and/or the pixel array control unit 46—may enable the processing entity to process various pixel-specific ADC outputs (P1 and P2 values), determine range values, render the results in a variety of formats including, for example, displaying a 3D image of the distant object based on TOF-based range measurements. In certain embodiments, the pixel array control unit 46 in the imaging module 17 may perform some of the processing of pixel outputs before the pixel output data are sent to the processor 19 for further processing and display. In other embodiments, the processor 19 also may perform some or all of the functionality of the pixel array control unit 46, in which case, the pixel array control unit 46 may not be a part of the imaging module 17.

In the preceding description, for purposes of explanation and not limitation, specific details are set forth (such as particular architectures, waveforms, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Thus, for example, it will be appreciated by those skilled in the art that block diagrams herein (e.g., in FIGS. 1-3) can represent conceptual views of illustrative circuitry or other functional units embodying the principles of the technology. Similarly, it will be appreciated that the flowchart in FIG. 7 represents various processes which may be substantially performed by a processor (e.g., the processor 19 and/or the pixel array control unit 46 in FIG. 2) in conjunction with various system components such as, for example, the projector module 22, the 2D pixel array 42, and the like. Such a processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the processing functionalities described above in the context of FIGS. 1-12 also may be provided by such a processor, in the hardware and/or software.

When certain inventive aspects require software-based processing, such software or program code may reside in a computer-readable data storage medium. As noted earlier, such data storage medium may be part of the peripheral storage 275, or may be part of the system memory 20 or any internal memory (not shown) of the image sensor unit 24, or the processor's 19 internal memory (not shown). In one embodiment, the processor 19 and/or the pixel array control unit 46 may execute instructions stored on such a medium to carry out the software-based processing. The computer-readable data storage medium may be a non-transitory data storage medium containing a computer program, software, firmware, or microcode for execution by a general purpose computer or a processor mentioned above. Examples of computer-readable storage media include a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the imaging module 17 or the system 15 comprising such an imaging module according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various 2D and 3D imaging functions discussed herein may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a system and method in which TOF technique is combined with analog amplitude modulation (AM) within each pixel in a pixel array using multiple SPADs in conjunction with a single PPD in each pixel. The PPD and SPADs in a pixel can be realized in a single die or in stacked dies. A SPAD may be shared among multiple neighboring pixels as well. The TOF information is added to the received light signal by the analog domain-based single-ended to differential converter inside the pixel itself. The spatial-temporal correlation among outputs of multiple, adjacent SPADs in a pixel is used to control the operation of the PPD to facilitate recording of TOF values and range of a 3D object. Erroneous range measurements due to ambient light may be prevented by stopping the charge transfer from the PPD—and, hence, recording a TOF value—only when two or more SPADs in the pixel are triggered within a pre-defined shutter time interval. As a result, an autonomous navigation system that uses an AM-based TOF image sensor as per teachings of the present disclosure may provide improved vision for drivers under difficult driving conditions such as, for example, low light, fog, bad weather, strong ambient light, and so on.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A pixel in an image sensor, the pixel comprising:
a plurality of a first type of diodes that each convert a received luminance into a corresponding electrical signal;
a second type of diode operable to store a charge; and
a control circuit coupled to the plurality of the first type of diodes, the control circuit initiating transfer of a first portion of the charge from the second type of diode, and terminating the transfer in response to at least two first type of diodes converting received luminance into the corresponding electrical signals a pre-defined time interval.

2. The pixel of claim 1, wherein the control circuit further receives a ramp-shaped modulating signal that controls transfer of the first portion of the charge, and
wherein the control circuit is further operable to transfer a second portion of the charge from the second type of diode, the second portion being substantially equal to a remainder of the charge after the first portion has been transferred.

3. The pixel of claim 1, wherein at least one first type of diode is biased to be used in an avalanche photo diode mode.

4. The pixel of claim 1, wherein an effective ratio of the second type of diode to the plurality of the first type of diodes in the pixel is 1:1, and
wherein all first type of diodes in the plurality of the first type of diodes are arranged in an N×N configuration in the pixel in which N≥2.

5. The pixel of claim 1, wherein the plurality of the first type of diodes of the pixel are located in a first die and the second type of diodes of the pixel is located in a second die that is in a stacked die configuration with the first die.

6. A method, comprising:
applying a modulating signal to a first type of diode in a pixel;
initiating transfer of a first portion of a charge stored in the first type of diode based on modulation received from the modulating signal;
detecting a light pulse by at least two second type of diodes in the pixel, the light pulse being reflected from an object, each of the at least two second type of diodes converting luminance received from the light pulse into a corresponding electrical signal;
terminating the transfer of the first portion of the charge based on electrical signals from at least two second type of diodes within a predetermined time interval; and
determining a Time of Flight (TOF) value of the light pulse based on the first portion of the charge transferred from the first type of diode.

7. The method of claim 6, further comprising:
generating a first pixel-specific output of the pixel from the first portion of the charge transferred from the first type of diode;
transferring a second portion of the charge from the first type of diode, the second portion being substantially equal to a remainder of the charge after the first portion of the charge has been transferred;
generating a second pixel-specific output of the pixel from the second portion of the charge transferred from the first type of diode; and
generating a first signal value corresponding to the first pixel-specific output and a second signal value corresponding to the second pixel-specific output using an analog-to-digital unit.

8. The method of claim 7, further comprising determining the TOF value of the light pulse using a ratio of the first signal value to a total of the first and the second signal values; and
determining a distance to the object based on the TOF value.

9. The method of claim 6, further comprising:
projecting the light pulse;
applying a shutter signal to the pixel a predetermined time period after projecting the light pulse;
detecting the light pulse that has been reflected from the object using the at least two first type of diodes while the shutter signal and the modulating signal are active;
generating a termination signal in response to the at least two second type of diodes detecting the light pulse while the shutter signal is active; and
terminating the transfer of the first portion of the charge in response to the termination signal.

10. The method of claim 6, wherein projecting the light pulse includes projecting the light pulse using a light source that is one of a laser light source, a light source that produces light in a visible spectrum, a light source that produces light in a non-visible spectrum, a monochromatic illumination source, an infrared (IR) laser, an X Y addressable light source, a point source having a two-dimensional (2D) scanning capability, a sheet source having a one-dimensional (1D) scanning capability, and a diffused laser.

11. An imaging unit, comprising:
a light source that projects a light pulse; and
an image sensor unit that comprises:
an array of pixels, at least one pixel comprising at least two diodes of a first type that each convert a received luminance into a corresponding electrical signal;
a diode of a second type operable to store a charge; and a control circuit coupled to the at least one pixel, the control circuit initiating transfer of a first portion of the charge from the diode of the second type, and terminating the transfer in response to the at least two diodes of the first type converting received luminance into the corresponding electrical signals.

12. The imaging unit of claim 11, further comprising a processing unit that determines a pixel-specific Time of Flight (TOF) value based on the first portion of the charge from the diode of the second type.

13. The imaging unit of claim 11, wherein at least one pixel of the array of pixels comprises an effective ratio of the diode of the second type to diodes of the first type of 1:1, and wherein at least one pixel comprises the diodes of the first type arranged in an N×N configuration in which N≥2.

14. The imaging unit of claim 11, wherein the diode of the first type of the pixel are located in a first die and the diode of the second type of the pixel is located in a second die that is in a stacked die configuration with the first die.

15. The pixel of claim 1, wherein a first type of diode comprises a Single Photon Avalanche Diode (SPAD) and a second type of diode comprises a Pinned Photo Diode (PPD).

16. The method of claim 6, wherein a first type of diode comprises a Pinned Photo Diode (PPD) and a second type of diode comprises a Single Photon Avalanche Diode (SPAD).

17. The imaging unit of claim 11, wherein a diode of the first type comprises a Single Photon Avalanche Diode (SPAD) and a diode of the second type comprises a Pinned Photo Diode (PPD).

18. A pixel in an image sensor, the pixel comprising:
a plurality of a first type of diodes that each convert a received luminance into a corresponding electrical signal;
a second type of diode operable to store a charge, the second type of diode being configured to receive no luminance; and
a control circuit coupled to the plurality of the first type of diodes, the control circuit initiating transfer of a first portion of the charge from the second type of diode, and terminating the transfer in response to at least two first type of diodes converting received luminance into the corresponding electrical signals a pre-defined time interval,
the plurality of the first type of diodes of the pixel being located on a same die as the second type of diode of the pixel.

19. The pixel of claim 18, wherein the first type of diode comprises a Single Photon Avalanche Diode (SPAD) and the second type of diode comprises a Pinned Photo Diode (PPD).

20. An imaging unit, comprising:
a light source that projects a light pulse; and
an image sensor unit that comprises:
an array of pixels, at least one pixel comprising at least two diodes of a first type that each convert a received luminance into a corresponding electrical signal;
a diode of a second type operable to store a charge, the diode of the second type being configured to receive no luminance; and
a control circuit coupled to the at least one pixel, the control circuit initiating transfer of a first portion of the charge from the diode of the second type, and terminating the transfer in response to the at least two diodes of the first type converting received luminance into the corresponding electrical signals.

21. The imaging unit of claim 20, wherein a diode of the first type comprises a Single Photon Avalanche Diode (SPAD) and a diode of the second type comprises a Pinned Photo Diode (PPD).

* * * * *

UNITED STATES PATENT AND TRADEMARK OFFICE
CERTIFICATE OF CORRECTION

PATENT NO. : 10,397,553 B2
APPLICATION NO. : 16/134954
DATED : August 27, 2019
INVENTOR(S) : Yibing Michelle Wang et al.

Page 1 of 1

It is certified that error appears in the above-identified patent and that said Letters Patent is hereby corrected as shown below:

In the Claims

In Column 31, Line 46, in Claim 1, insert -- within -- before "a pre-defined time".

In Column 34, Line 6, in Claim 18, insert -- within -- before "a pre-defined time".

Signed and Sealed this
Eighteenth Day of February, 2020

Andrei Iancu
*Director of the United States Patent and Trademark Office*